US006445648B2

(12) United States Patent
Yamaguchi

(10) Patent No.: US 6,445,648 B2
(45) Date of Patent: Sep. 3, 2002

(54) MAGNETIC FIELD GENERATOR AND MAGNETO-OPTICAL STORAGE DEVICE USING THE SAME

(75) Inventor: Hideki Yamaguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/818,818

(22) Filed: Mar. 27, 2001

Related U.S. Application Data

(63) Continuation of application No. PCT/JP99/03106, filed on Jun. 10, 1999.

(30) Foreign Application Priority Data

Nov. 13, 1998 (JP) .............................. 10-324023

(51) Int. Cl.⁷ ................................................. G11B 11/00
(52) U.S. Cl. ................................................... 369/13.17
(58) Field of Search ........................... 369/13.14, 13.17, 369/13.22, 13.18; 360/59, 122, 125, 234.9, 66, 344.4, 245.9, 246.2

(56) References Cited

U.S. PATENT DOCUMENTS 4,849,952 A * 7/1989 Shiho ...................... 369/13.17
5,361,242 A * 11/1994 Chaya et al. ............. 369/13.17
5,710,745 A * 1/1998 Getreuer ................... 369/13.23

FOREIGN PATENT DOCUMENTS

| JP | 62264403 | | 11/1987 |
| JP | 63124201 | * | 5/1988 |
| JP | 63124203 | * | 5/1988 |
| JP | 01196756 | * | 8/1989 |
| JP | 03037848 | * | 2/1991 |
| JP | 03254403 | * | 11/1991 |
| JP | 3254404 | | 11/1991 |
| JP | 4069801 | | 3/1992 |
| JP | 4188404 | | 7/1992 |
| JP | 4370594 | | 12/1992 |

* cited by examiner

*Primary Examiner*—David Hudspeth
*Assistant Examiner*—Angel Castro
(74) *Attorney, Agent, or Firm*—Greer, Burns & Crain, Ltd.

(57) ABSTRACT

A magnetic field generator includes a top yoke having an opening, a back yoke fixed to the top yoke, a center yoke fixed to the back yoke in such a manner as to face to the opening of the top yoke, and a coil wound around the center yoke. The opening has a straight-line shaped central portion with its gap kept constant, and both end portions with their gaps becoming larger as going outwardly from the vicinities of both end portions of the center yoke.

11 Claims, 23 Drawing Sheets

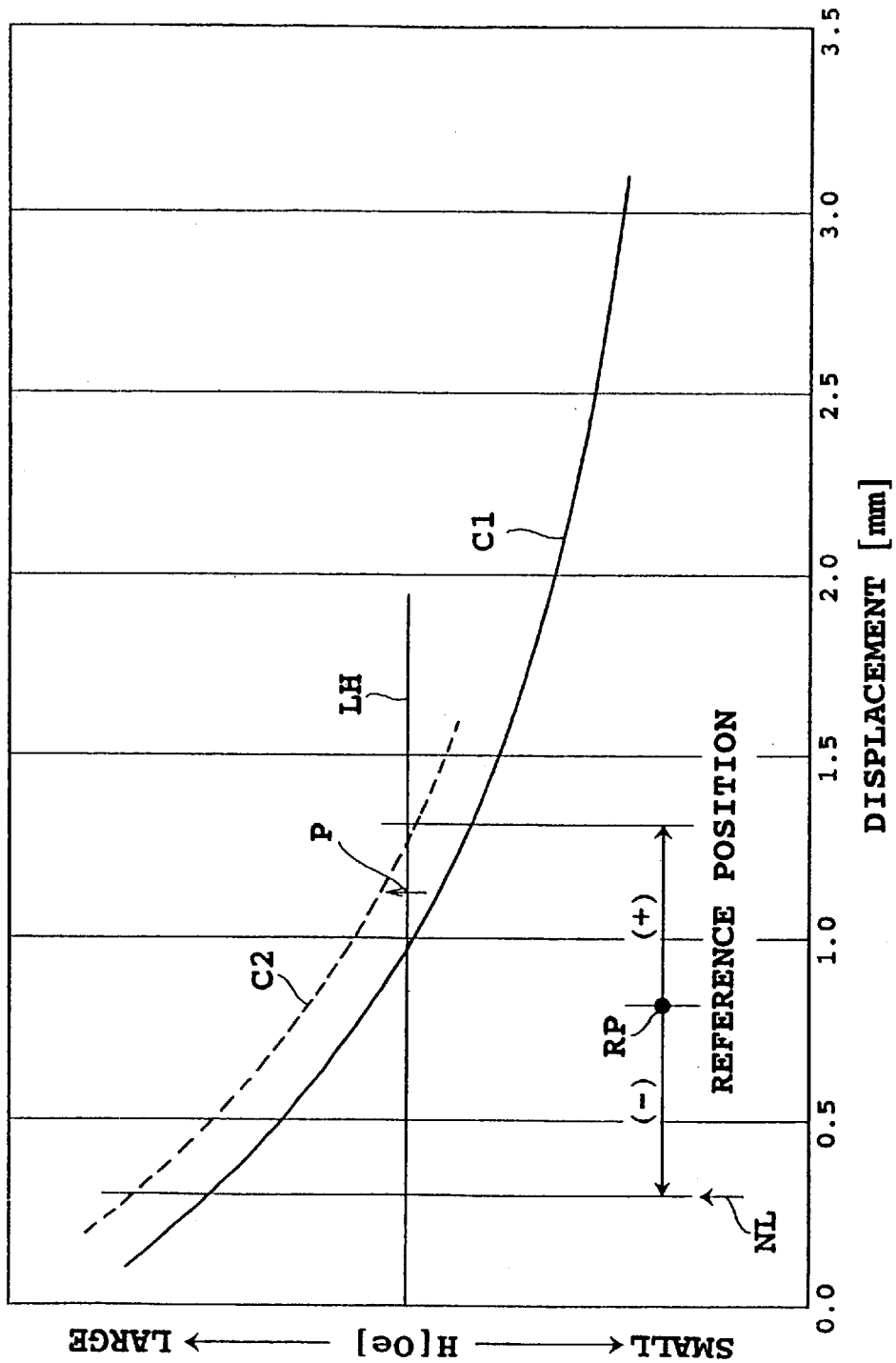

MAGNETIC FIELD GENERATOR AND MAGNETO-OPTICAL STORAGE DEVICE USING THE SAME

This is a continuation of International Application No. PCT/JP99/03106, filed Jun. 10, 1999.

BACKGROUND OF THE INVENTION

1. Field of the Invention

The present invention generally relates to a magneto-optical storage device, and particularly to a magnetic field generator used for the magneto-optical storage device.

2. Description of the Related Art

In recent years, along with the improved processing abilities and processing speeds of personal computers, program capacities and data capacities of operating systems and application software programs have been increased. Under such situations, there have been strong demands toward enhancement of capacities and speeds as well as miniaturization and cost-reduction of external storage devices. As one kind of external storage devices, a magneto-optical disk drive has been developed and extensively used at present. The magneto-optical disk drive uses a magnetic body as a recording medium, and records and reproduces information by making use of light and magnetic fields.

Higher density recording has been required for the magneto-optical disk drive year by year, and to meet such a requirement, various methods for recording information by using the magneto-optical disk drive have been developed. Of these methods, a light modulation method has been generally used at present. The light modulation method records information on a magneto-optical recording medium by modulating a laser beam with recording data while applying an external magnetic field in a specific direction. In this light modulation method, a recording density of information is generally restricted by a size of a beam spot.

The magneto-optical disk drive includes means for generating a magnetic field necessary for recording/reproducing/erasing of information. The magnetic field generating means is represented by a magnetic field generator using a permanent magnet or an electric magnet. A prior art magnetic field generator using an electric magnet is shown in FIG. 1. The magnetic field generator is configured such that a center yoke 4 is fixed on a back yoke 2 formed of a steel plate. The center yoke 4 is formed of a cold-rolled steel plate specified in JIS (SPCC).

A coil 6 is inserted around the center yoke 4 in such a manner that the center yoke 4 is surrounded by winding of the coil 6. A top yoke 8 having an opening 10 is disposed over the coil 6. The center yoke 4 faces to the opening 10 having a specific width or gap. The top yoke 8 is also formed of a steel plate. In the case of a magneto-optical disk drive, the top yoke 8 is formed of part of a cartridge holder for accommodating a magneto-optical disk cartridge having been inserted in the disk drive.

When a specific current is applied to the coil 6, a magnetic field is generated from a surface of the center yoke 4. A magneto-optical disk (not shown) is rotatably supported while facing to the center yoke 4. An optical head is movably provided opposite to the center yoke 4 with respect to the magneto-optical disk, and the magneto-optical disk is irradiated with a light beam emitted from the optical head. A length of the center yoke 4 is substantially equal to a seek range of the optical head.

In the prior art magnetic field generator shown in FIG. 1, a width of the opening 10 of the top yoke 8 has been kept constant in the longitudinal direction thereof from the viewpoint of production ease. Accordingly, the shape effect of the opening 10 exerted on the magnetic field has not been examined at all. Further, as the material of the center yoke 4, there has been used a general cold-rolled steel plate being relatively low in relative magnetic permeability. This is one of causes of increasing the power consumption of the coil 6 for obtaining a necessary magnetic field.

FIG. 2 shows a magnetic field distribution of the prior art magnetic field generator in the longitudinal direction (radial direction of a magneto-optical disk), and FIG. 3 shows a magnetic field distribution of the prior art magnetic field generator in the lateral direction. In the graphs of FIGS. 2 and 3, the abscissa indicates a displacement from the center of the center yoke 4, and the ordinate indicates a magnetic field strength. In the magnetic field distribution in the longitudinal direction shown in FIG. 2, the non-uniformity of the magnetic field strength in a recording region is observed. In particular, the magnetic field strength becomes rapidly large at each end of the recording region. Accordingly, there is a possibility that a magnetic field having an excessively large strength is generated at each end of the recording region, and thereby the recorded information may be erroneously erased and the recording/reproducing/erasing conditions cannot be optimized at some recording positions.

FIG. 4 shows a magnetic field distribution in the height direction, wherein the abscissa indicates a distance from the center yoke to a magneto-optical disk and the ordinate indicates a magnetic field strength. As is apparent from this figure, a magnetic field in the height direction depending on a gap between the center yoke 4 and the magneto-optical disk becomes higher and thereby a magnetic field generation efficiency at the same coil current value becomes larger as the center yoke 4 comes closer to the magneto-optical disk.

In the prior art magnetic field generator, the gap between the center yoke 4 and the magneto-optical disk is set to 0.8 mm. However, in actual, an assembly variation of ±0.5 mm from a reference position (design position) RP is allowable. If the center yoke 4 comes excessively close to the magneto-optical disk, there may occur an inconvenience in which data be destroyed due to the contact therebetween. From this viewpoint, a nearest limit position NL is specified at about 0.3 mm.

In FIG. 4, a straight line LH designates a necessary lowest magnetic field strength, and C1 designates a magnetic field strength against an arbitrary current value. A curve C2 shown by a broken like designates a magnetic field strength curve after a current applied to the coil 6 is increased for obtaining a necessary magnetic field as shown by an arrow P. In this way, according to the prior art magneto-optical disk drive, to obtain a necessary magnetic field, it has been required to correct an assembly variation of the center yoke 4 by increasing a current applied to the coil 6.

SUMMARY OF THE INVENTION

An object of the present invention is to provide a magnetic field generator capable of increasing a magnetic field generation efficiency and realizing stable characteristics over the entire recording region.

Another object of the present invention is to provide a magneto-optical storage device capable of realizing stable characteristics over the entire recording regions.

In accordance with an aspect of the present invention, there is provided a magnetic field generator including: a coil; a center yoke disposed in a central portion of the coil; a top yoke having an opening from which an upper portion of the center yoke is exposed, the top yoke being disposed on an upper surface side of the coil; and a back yoke disposed on a back surface side of the coil; wherein the opening has a straight-line shaped central portion with its gap kept constant, and enlarged portions with their gaps becoming larger as going outwardly from the vicinities of both end portions of the center yoke.

Preferably, the center yoke is made from a high permeability material. More preferably, the magnetic field generator is provided with adjustably fixing means for adjustably fixing the back yoke to the top yoke. The adjustably fixing means may include a plate spring for biasing the back yoke in the direction in which the back yoke becomes apart from the top yoke, and fastening means for fastening the back yoke to the top yoke against a biasing force of the spring. By the provision of the adjustably fixing means, a gap between the center yoke and a surface of the magneto-optical recording medium can be adjusted at an optimum value, to thereby correct an assembly error.

In accordance with another aspect of the present invention, there is a provided magneto-optical storage device for storing information on a magneto-optical storage medium, including: a holder for accommodating the magneto-optical storage medium having been inserted in the magneto-optical storage device; an optical head for irradiating the magneto-optical storage medium with a light beam; and a magnetic field generator disposed on the holder; wherein the magnetic field generator includes: a coil; a center yoke disposed in a central portion of the coil; a top yoke having an opening from which an upper portion of the center yoke is exposed, the top yoke being disposed on an upper surface side of the coil; and a back yoke disposed on a back surface side of the coil; wherein the opening has a straight-line shaped central portion with its gap kept constant, and enlarged portions with their gaps becoming larger as going outwardly from the vicinities of both end portions of the center yoke.

In accordance with a further aspect of the present invention, there is provided a magneto-optical storage device for storing information on a magneto-optical storage medium, including: a holder for accommodating the magneto-optical storage medium having been inserted in the magneto-optical storage device; an optical head for irradiating the magneto-optical storage medium with a light beam; and a magnetic field generator disposed on the holder; wherein the magnetic field generator includes: a coil; a center yoke disposed in a central portion of the coil; a top yoke having an opening from which an upper portion of the center yoke is exposed, the top yoke being disposed on an upper surface side of the coil; a back yoke disposed on a back surface side of the coil; and adjustably fixing means for fixing the back yoke to the top yoke after adjustably setting a position of the back yoke to the top yoke.

The above and other objects, features and advantages of the present invention and the matter of realizing them will become more apparent, and the invention itself will best be understood from a study of the following description and appended claims with reference to the attached drawings showing some preferred embodiments of the invention.

BRIEF DESCRIPTION OF THE DRAWINGS

FIG. 4 is a graph showing a graph showing a magnetic field in the height direction of the prior art magnetic field generator shown in FIG. 1;

DESCRIPTION OF THE PREFERRED EMBODIMENTS

Figure 5A:
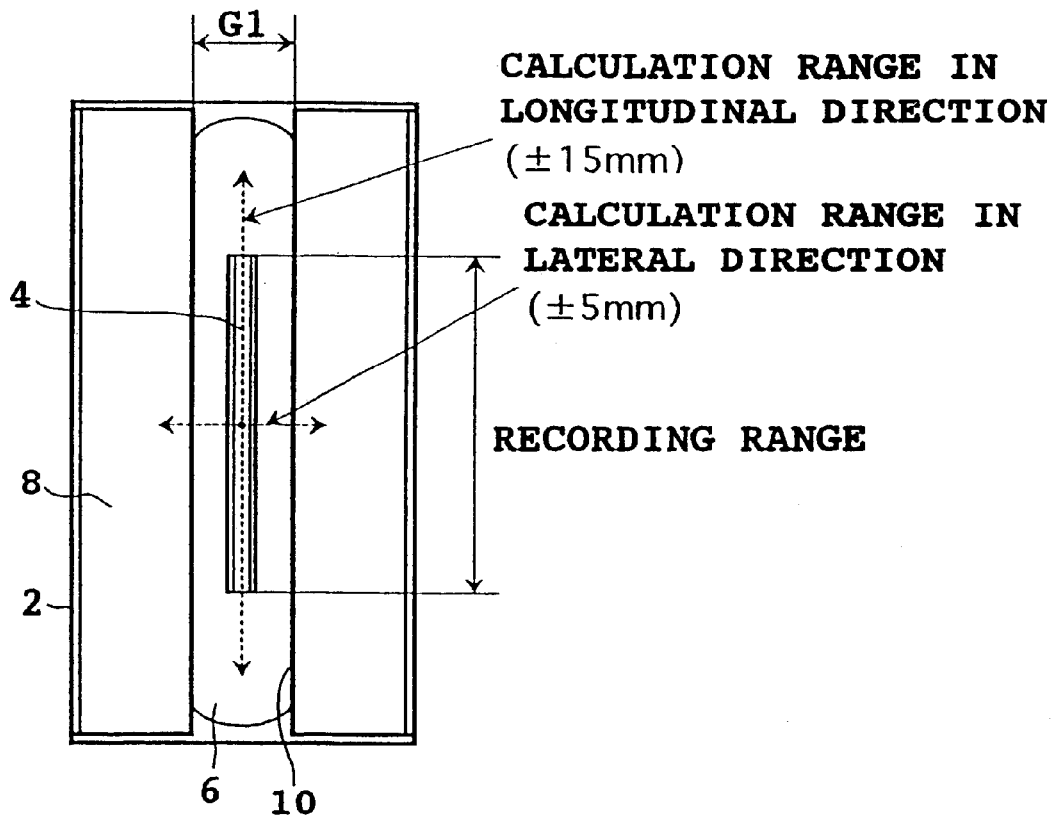
FIGS. 5A and 5B are views illustrating a magnetic field generator used for simulation.
Figure 5B:
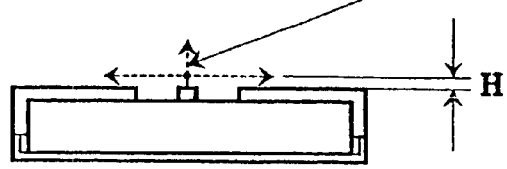

Prior to description of preferred embodiments of the present invention, there will be described a result of computer simulation performed for increasing a magnetic field generation efficiency of a magnetic field generator. FIGS. 5A and 5B are views illustrating a magnetic field generator used for simulation. The magnetic field generator shown in these figures has the same configuration as that of the prior art magnetic field generator shown in FIG. 1. That is to say, a center yoke 4 is disposed on a back yoke 2, and a coil 6 is disposed around the center yoke 4.

A top yoke 8 having an opening 10 is positioned over the coil 6. While schematically shown, the back yoke 2 is mounted to a cartridge holder, and the top yoke 8 is formed by pressing part of the cartridge holder. The opening 10 has a width G1 kept constant over the entire length thereof in the longitudinal direction. The width G1 is set to 6.2 mm. A calculation range of a magnetic field strength in the longitudinal direction is set to a range of ±15 mm apart from the center of the center yoke 4 in the longitudinal direction. A calculation range of a magnetic field strength in the lateral direction is set to a range of ±5 mm apart from the center of the center yoke 4 in the lateral direction. In calculation of the magnetic field strength in each of the longitudinal and lateral directions, a gap between the center yoke 4 and a magneto-optical recording medium is fixed to 0.8 mm. A calculation range of a magnetic field strength in the height direction is set to a range of 0 to 3 mm in the direction of a gap H between the surface of the center yoke and the surface of the magneto-optical recording medium.

Figure 2:
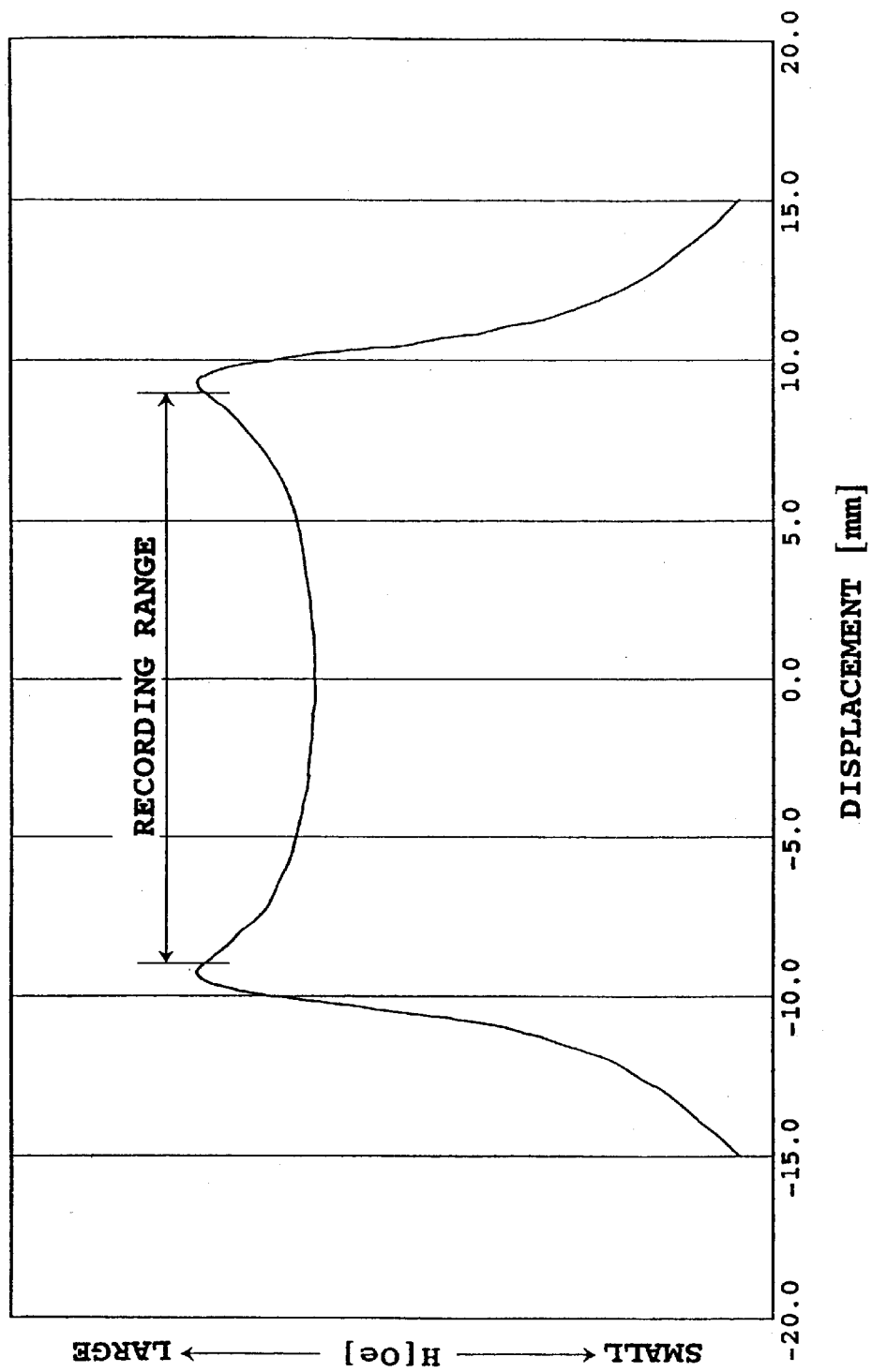
FIG. 2 is a graph showing a magnetic field distribution in the longitudinal direction of the prior art magnetic field generator shown in FIG. 1.
Figure 3:
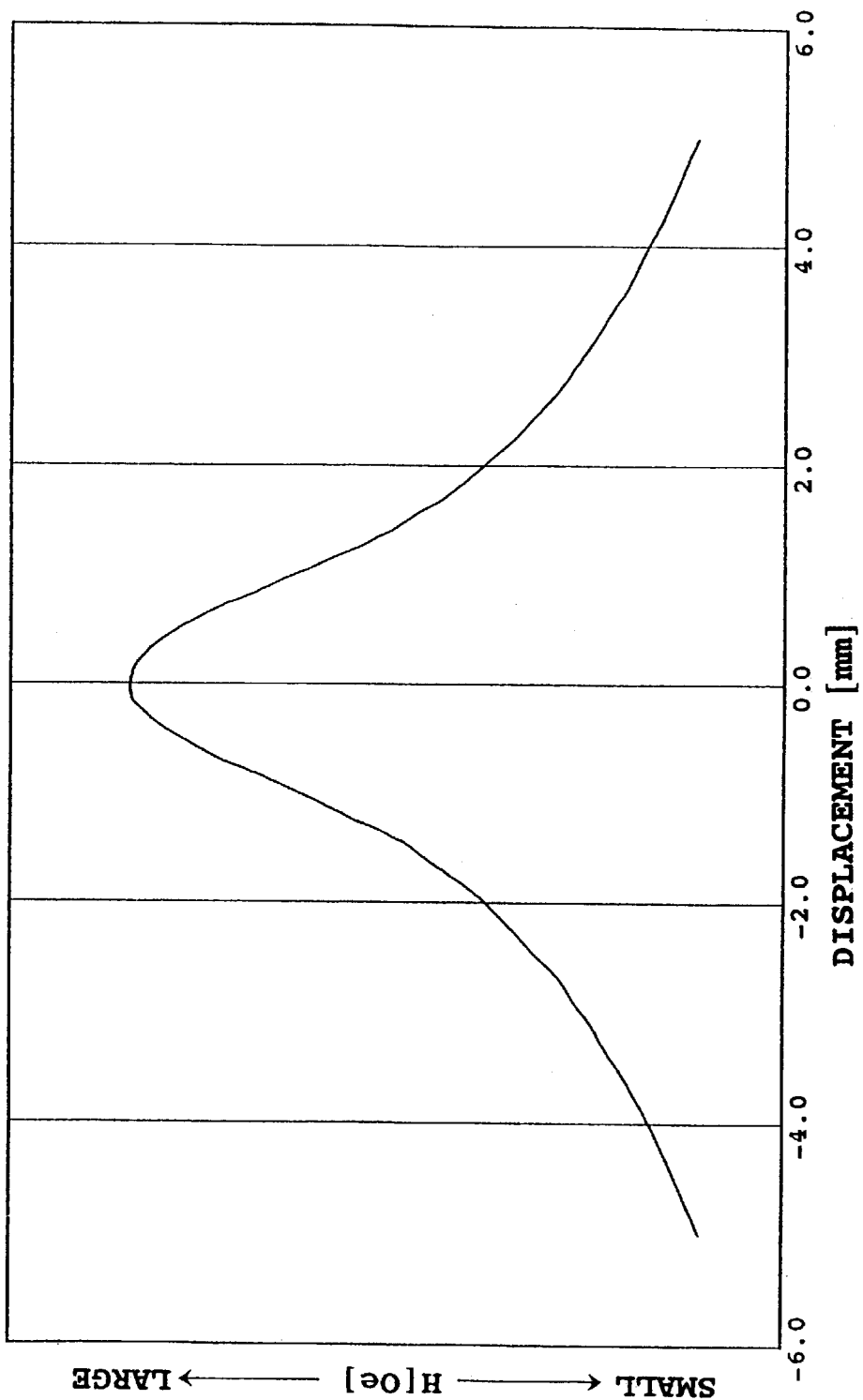
FIG. 3 is a graph showing a magnetic field distribution in the lateral direction of the prior art magnetic field generator shown in FIG. 1.

The calculated magnetic field distributions in the longitudinal and lateral directions are as shown in FIGS. 2 and 3, which are the above-described graphs showing the magnetic field distributions in the longitudinal and lateral directions of the prior art magnetic field generator. In the calculated magnetic field distribution in the longitudinal direction shown in FIG. 2, the non-uniformity of the magnetic field strength in a recording region is observed. In particular, the magnetic field strength becomes rapidly large at each end of the recording region. The calculated magnetic field distribution in the height direction is as shown in FIG. 4, which is the above-described graph showing the magnetic field distribution in the height direction of the prior art magnetic field generator. As is apparent from FIG. 4, the magnetic field in the height direction is dependent on a gap between the center yoke 4 and the magneto-optical disk.

Figure 1:
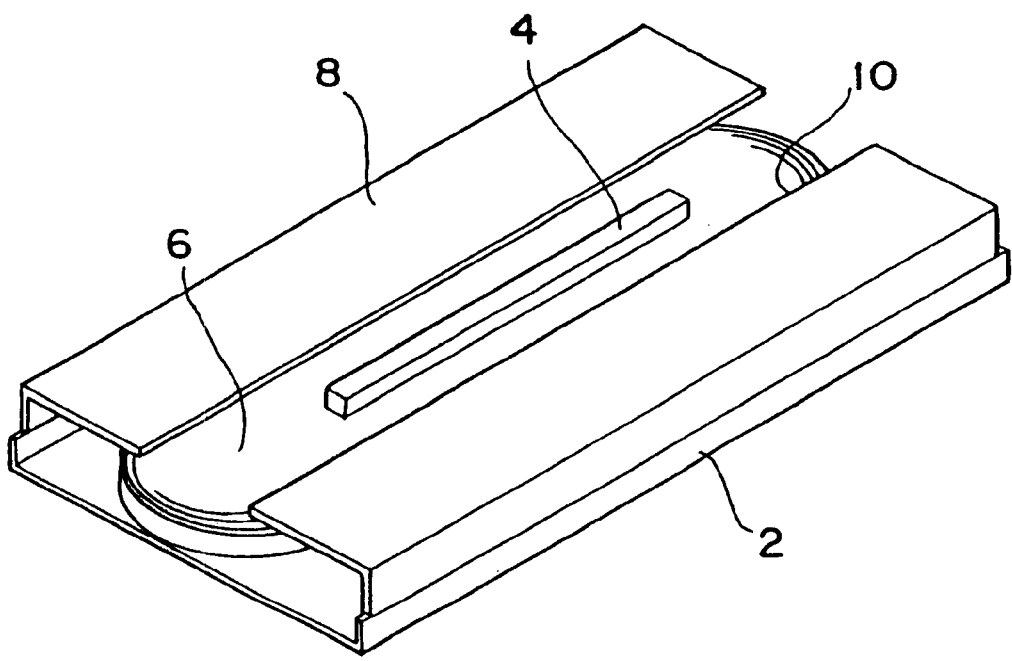
FIG. 1 is a perspective view of a prior art magnetic field generator.
Figure 6:
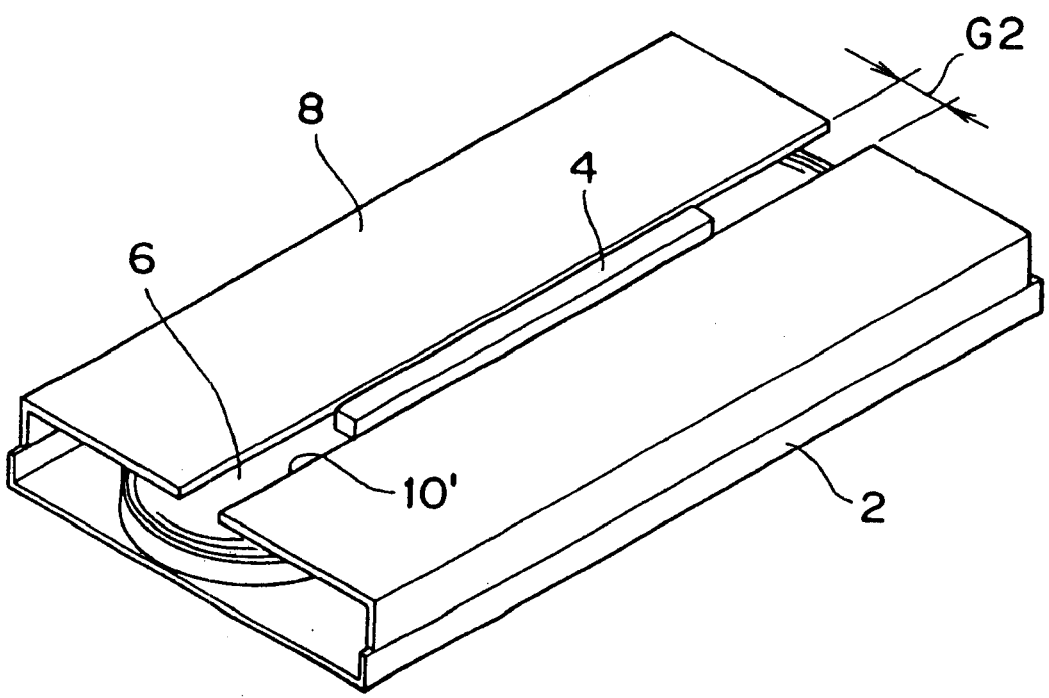
FIG. 6 is a perspective view showing a magnetic field generator in which a top yoke is closer to a center yoke.
Figure 7:
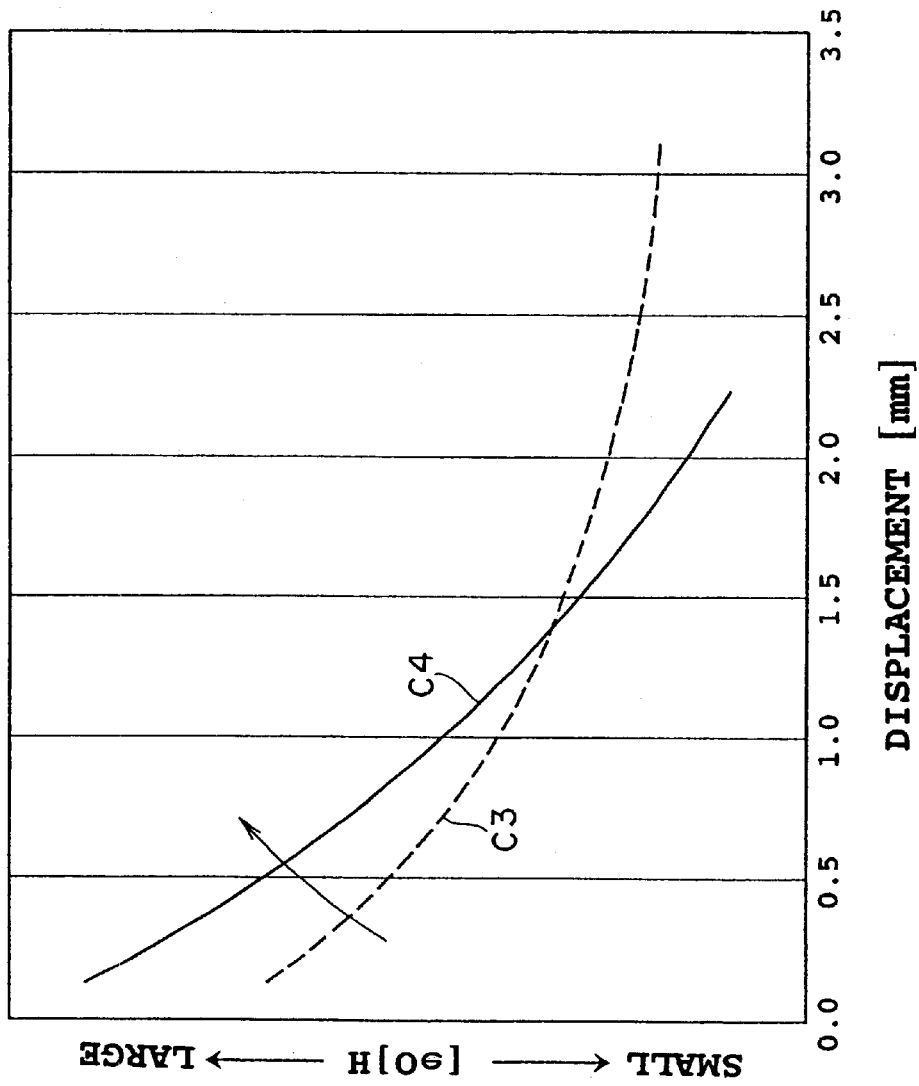
FIG. 7 is a graph showing magnetic field strengths of the magnetic field generator shown in FIG. 6 and the prior art magnetic field generator shown in FIG. 1.

FIG. 6 is a perspective view of a magnetic field generator in which a top yoke 8 is closer to a center yoke 4 as compared with the top yoke 8 of the prior art magnetic field generator shown in FIG. 1. To be more specific, a gap G2 of an opening 10' of the top yoke 8 shown in FIG. 6 is as narrow as 3.8 mm. The other configuration of the magnetic field generator shown in FIG. 6 is the same as that of the prior art magnetic field generator shown in FIG. 1. FIG. 7 is a graph showing magnetic field strengths of the prior art magnetic field generator shown in FIG. 1 and the magnetic field generator shown in FIG. 6, wherein the abscissa designates a displacement in the height direction and the ordinate designates a magnetic field strength. In this graph, a dashed line curve C3 is for the prior art magnetic field generator and a solid line curve C4 is for the magnetic field generator shown in FIG. 6. As is apparent from this graph, the magnetic field strength can be improved by narrowing the width (gap) of the opening of the top yoke.

Figure 8:
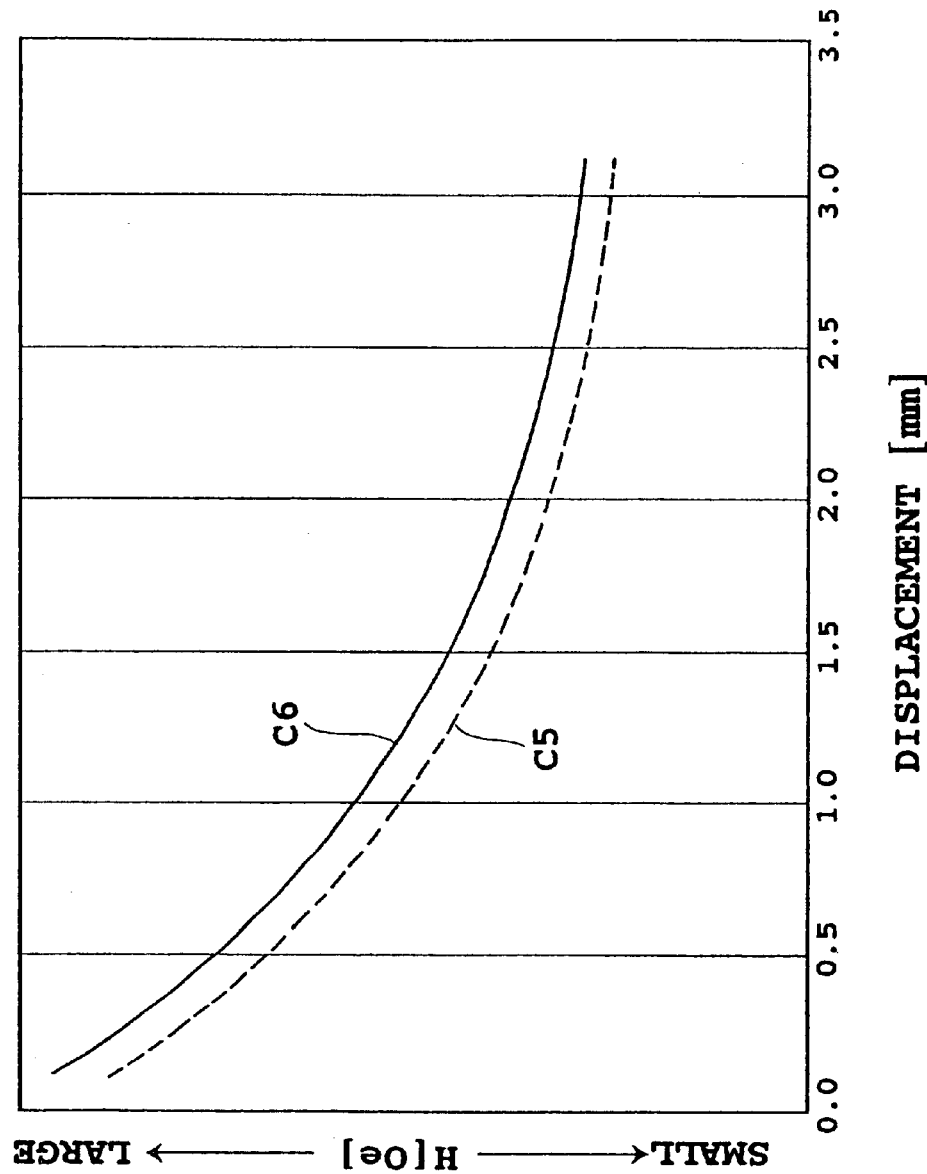
FIG. 8 is a graph showing magnetic field strengths of a magnetic field generator using a center yoke made from permalloy and the prior art magnetic field generator using a conventional center yoke.

FIG. 8 is a graph showing magnetic field strengths of the prior art magnetic field generator using the center yoke made from a cold-rolled steel plate (JIS SPCC) and a magnetic field generator using a center yoke made from permalloy, in which the abscissa designates a displacement in the height direction and the ordinate designates a magnetic field strength. In this graph, a dashed line curve C5 is for the prior art magnetic field generator and a solid line curve C6 is for the magnetic field generator using the center yoke made from permalloy. As is apparent from this graph, the magnetic field generation efficiency at the same current applied to the coil can be improved by adopting a high permeability material as the material of the center yoke. Specific examples of the high permeability materials may include permalloy, silicon steel, and soft magnetic iron.

Figure 9:
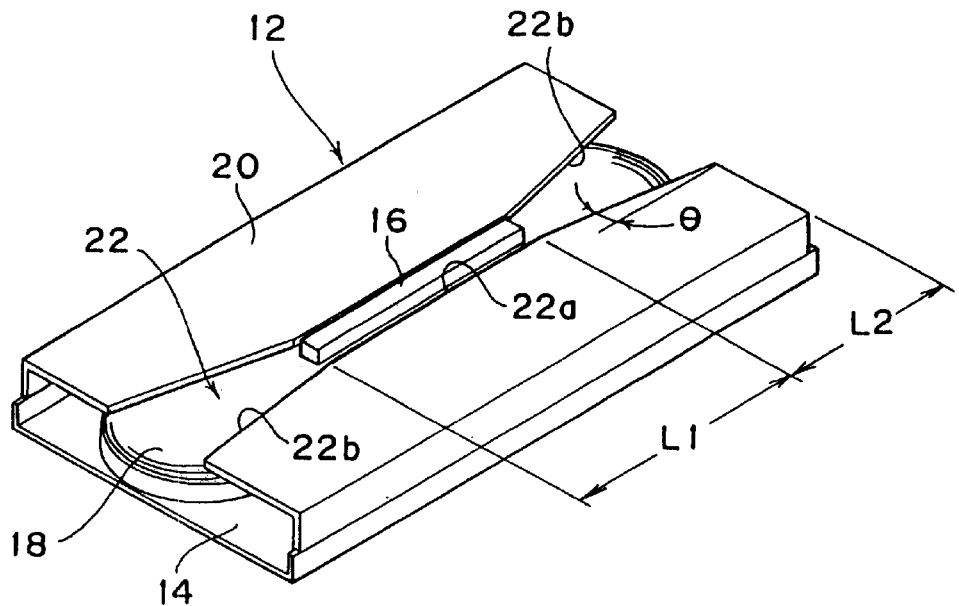
FIG. 9 is a view showing a principle of a magnetic field generator of the present invention.

FIG. 9 is a view showing a principle of a magnetic field generator 12 of the present invention based on the above-described simulation result. A center yoke 16 made from permalloy is fixed on a back yoke 14 formed of a steel plate. A coil 18 is inserted around the center yoke 16. A top yoke 20 having an opening 22, which is formed of a steel plate, is disposed over the back yoke 14. In a magneto-optical storage device to which the magnetic field generator of the present invention is applied, part of a cartridge holder for accommodating a recording medium cartridge having been inserted in the storage device is cut and folded, to be used as the top yoke 20.

The center yoke 16 is formed into a rectangular shape in cross-section, and has a length of about 20.5 mm. The opening 22 has a straight-line shaped central portion 22a with its gap (width) kept constant, and both end portions 22b with their gaps becoming larger as going outwardly from the vicinities of both ends of the center yoke 16. The straight-line shaped central portion 22a of the opening 22 of the top yoke 20 may be made as close to the center yoke 16 as possible to the extent that it does not come in contact with the center yoke 16. The magnetic field strength can be improved by setting the gap of the straight-line shaped central portion 22a to a value smaller than 5 mm and larger than the width of the center yoke 16. Concretely, the gap of the straight-line shaped central portion 22a is set to about 3.8 mm and a length L1 thereof is set to about 20.5 mm. A length L2 of each of the both end portions 22b of the opening 22 is set to about 7 mm, and a tilt angle θ thereof is set to about 10°.

Figure 11:
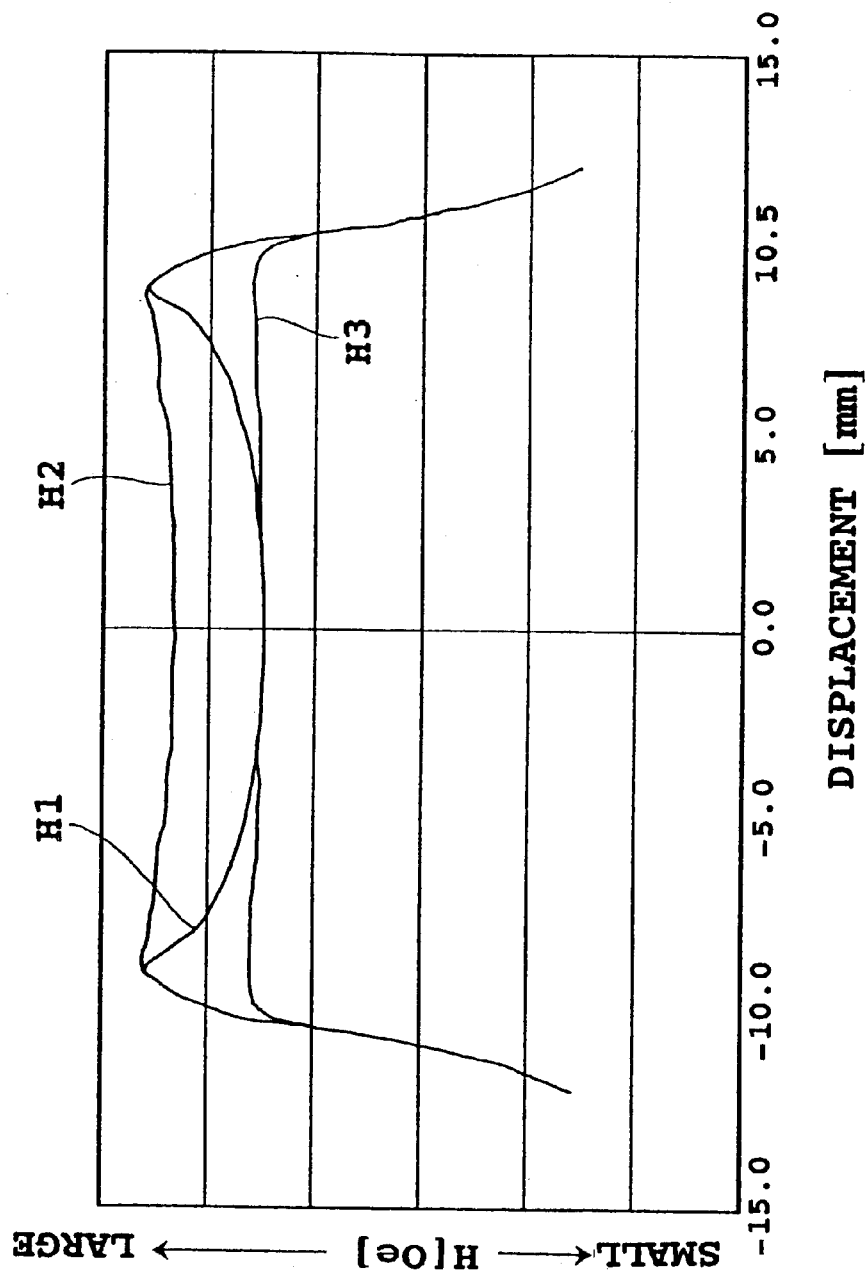
FIG. 11 is a graph showing magnetic field distributions in the longitudinal direction of the magnetic field generators of the present invention shown in FIGS. 9 and 10 and the prior art magnetic field generator shown in FIG. 1.

In the magnetic field generator 12 of the present invention, since the gap of the straight-line shaped portion 22a of the opening 22 is narrower than that of the prior art magnetic field generator shown in FIG. 1, a magnetic field generation efficiency thereof is improved as shown by the graph in FIG. 7. Further, since the both end portions 22b of the opening 22 are formed in the shapes with their gaps becoming larger as going outwardly, a magnetic field strength distribution being substantially kept constant over the entire length of the center yoke 16 can be obtained as shown by a curve H2 in FIG. 11. In FIG. 11, a curve H1 designates a magnetic field strength distribution of the prior art magnetic field generator.

Figure 10:
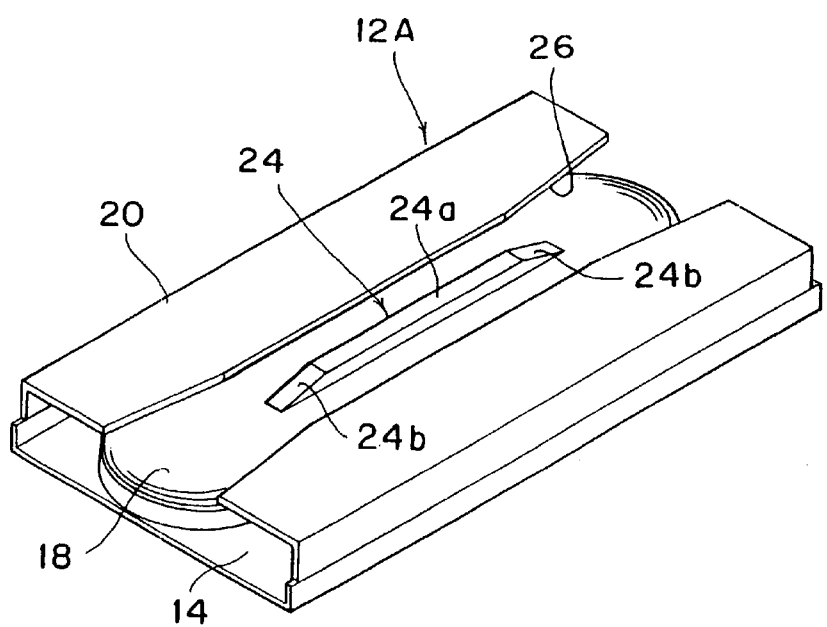
FIG. 10 is a view showing a modification of the magnetic field generator of the present invention.

FIG. 10 is a perspective view showing a modification of the magnetic field generator of the present invention. In a magnetic field generator 12A as the modification shown in FIG. 10, a center yoke 24 has a central portion 24a formed into a rectangular shape in cross-section, and both end portions 24b formed into tapered shapes. An opening 26 of a top yoke 20 has a central portion having a constant width of about 6.2 mm and both end portions each of which is tilted at an angle are smaller than that of each of the both end portions 22b of the opening 22 shown in FIG. 9. Even in this modification in which the both end portions 24b of the center yoke 24 are tapered, a magnetic field distribution being kept substantially constant over the entire length of the center yoke 24 can be obtained as shown by a straight line H3 in FIG. 11. Of course, the magnetic field distribution H3 shown in FIG. 11 can be increased up to the magnetic field distribution H2 shown in FIG. 11 by narrowing the gap of the opening 26.

Figure 12:
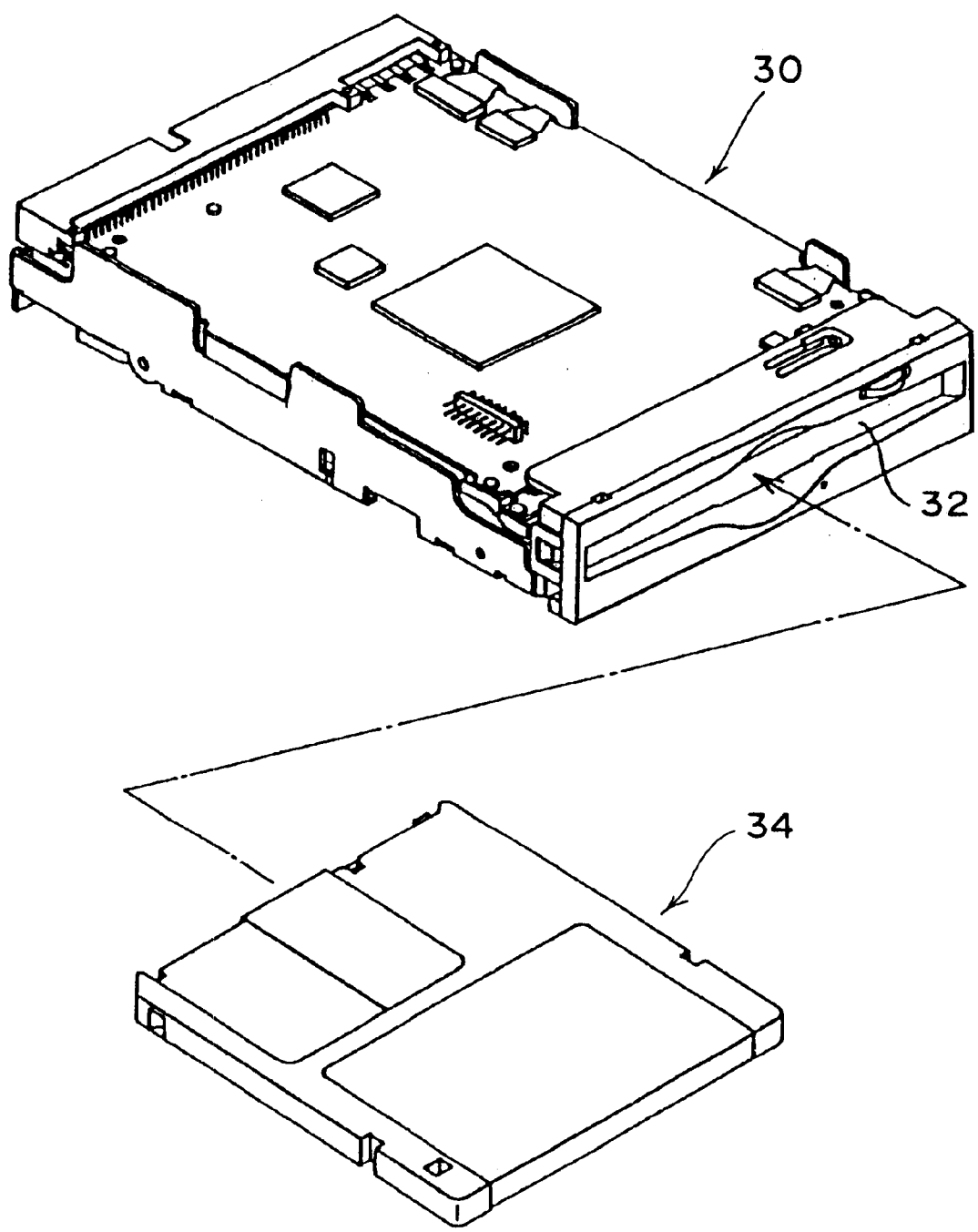
FIG. 12 is a perspective view of an appearance of an upper surface side of a magneto-optical disk drive to which the present invention is applied.
Figure 13:
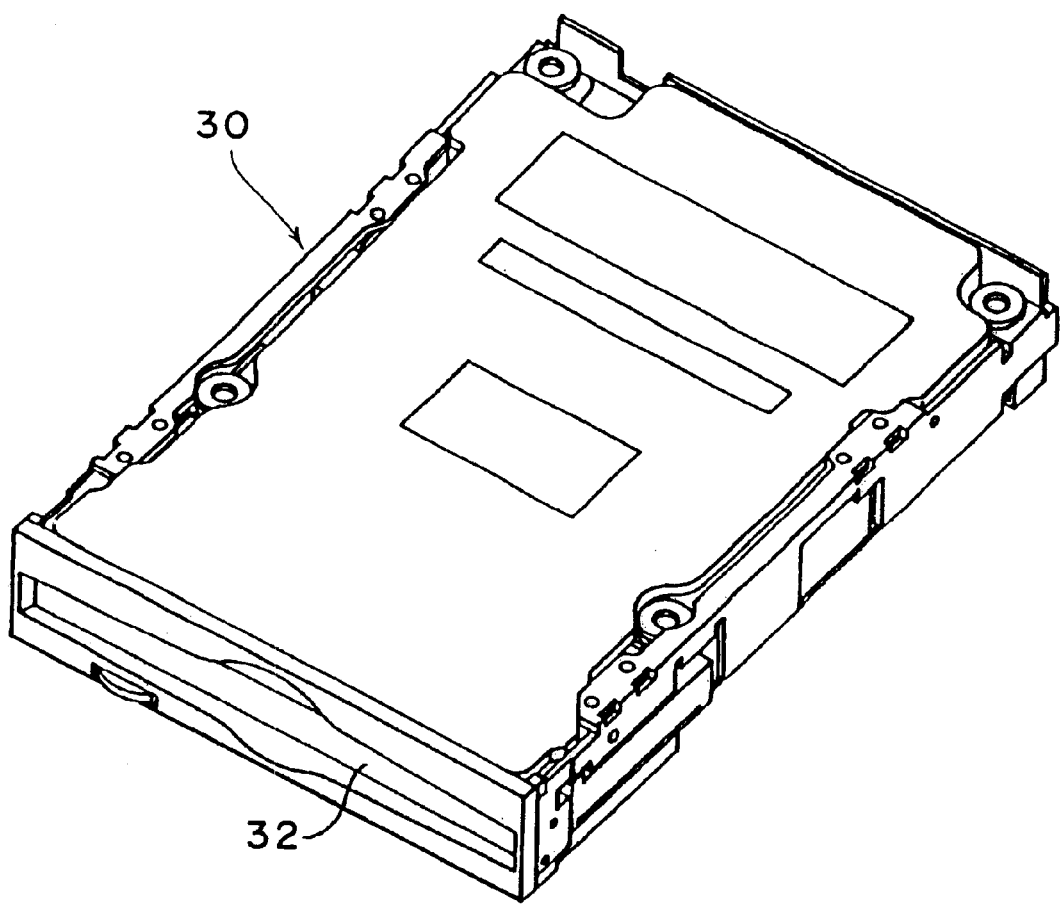
FIG. 13 is a perspective view of an appearance of a back surface side of the magneto-optical disk drive shown in FIG. 12.

Hereinafter, a preferred embodiment in which the principle of the present invention is applied to a magneto-optical disk drive will be described. FIG. 12 is a perspective view of an upper surface side of a magneto-optical disk drive 30 to which the present invention is applied, and FIG. 13 is a perspective view of a back surface side of the magneto-optical disk drive 30. A magneto-optical disk cartridge 34 in which a magneto-optical disk has been contained is inserted in the magneto-optical disk drive 30, and the magneto-optical disk drive 30 reads or writes data from or to the magneto-optical disk in the magneto-optical disk cartridge 34. A load/ejector mechanism for the magneto-optical disk cartridge 34, a spindle motor for rotating the magneto-optical disk, a bias magnetic field generating mechanism, a positioner, a lens actuator, and a fixed optical system are contained in the magneto-optical disk drive 30. The magneto-optical disk cartridge 34 is inserted in the magneto-optical disk drive 30 from an insertion port 32 of the magneto-optical disk drive 30.

Figure 14A:
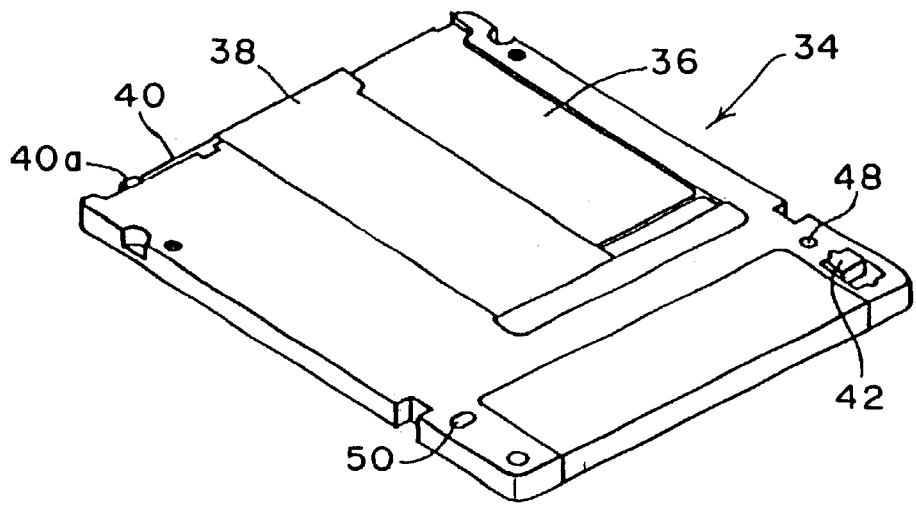
FIG. 14A is a view showing a structure of a magneto-optical disk cartridge in a state in which a shutter is closed.
Figure 14B:
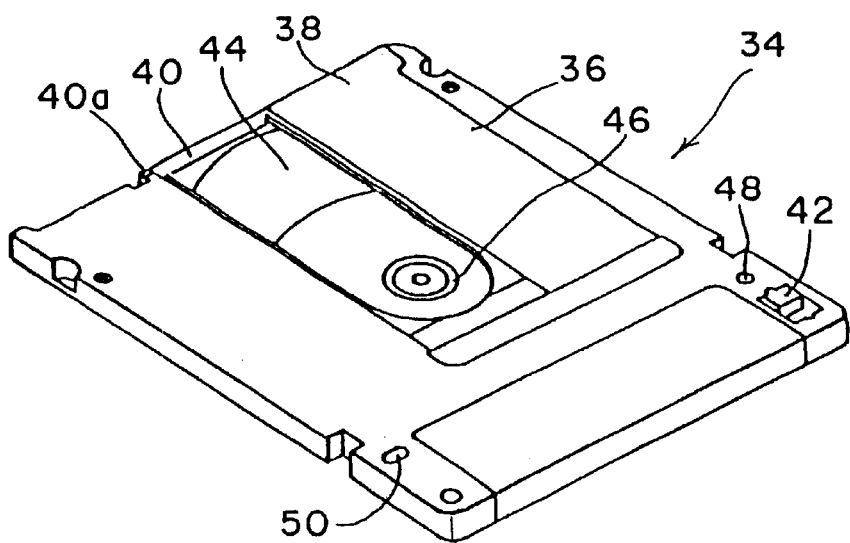
FIG. 14B is a view showing a structure of the magneto-optical disk cartridge in a state in which the shutter is opened.

FIGS. 14A and 14B show a structure of the magneto-optical disk cartridge 34 to be inserted in the magneto-optical disk drive 30. While FIG. 12 show a front side of the magneto-optical disk cartridge 34, FIGS. 14A and 14B show a back surface side of the magneto-optical disk cartridge 34. As shown in FIG. 14A. a shutter 38 is provided on a cartridge case 36 of the magneto-optical disk cartridge 34, and a shutter opening arm 40 is mounted to an end portion of the shutter 38. A write protector tab 42 for prohibiting writing to the magneto-optical disk is provided at one end of the cartridge case 36.

When an end portion 40a of the shutter opening arm 40 is pushed by a slider to be described later, the shutter 38 is slid on the cartridge case 36, to be thus opened. FIG. 14B shows the magneto-optical disk cartridge 34 in a state in which the shutter 38 is full-opened. A magneto-optical disk 44 as a medium for recording data is contained in the cartridge case 36. The magneto-optical disk 44 is configured such that a hub 46 positioned at a central portion of the magneto-optical disk 44 is chucked and rotated by the spindle motor to be described later. Two reference holes 48 and 50 for positioning the magneto-optical disk cartridge 34 in the magneto-optical disk drive 30 are provided on both sides of the vicinity of a rear end portion on the bottom surface side of the cartridge case 36. One reference hole 48 is a round hole, and the other reference hole 50 is a long hole.

Figure 15A:
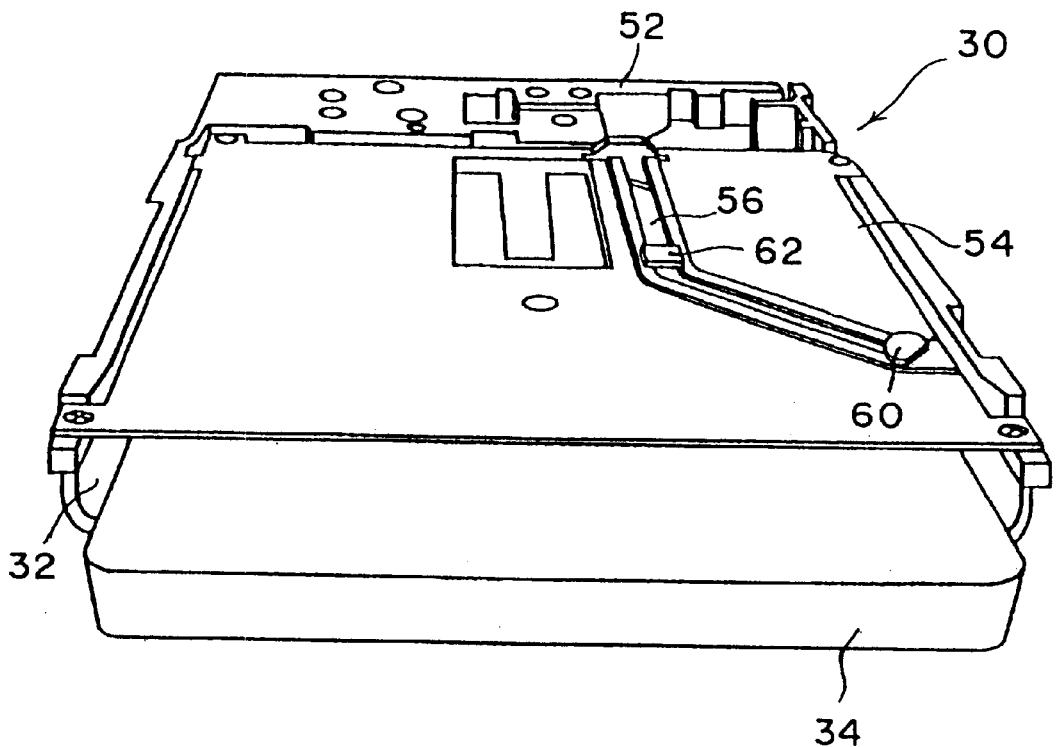
FIG. 15A is a perspective view, seen from a front side, of the magneto-optical disk drive in a state in which a cover is removed therefrom.

FIG. 15A is a perspective view, seen from a front side, of the magneto-optical disk drive 30 in a state in which a cover is removed therefrom. A cartridge holder 54 for accommodating the magneto-optical disk cartridge 34 having been inserted in the disk drive 30 is mounted on a drive base 52. The cartridge holder 54 has a guide groove 56. The guide groove 56 is formed in such a manner as to be tilted inwardly from an end portion of the cartridge insertion port 32, and to be bend from a middle point thereof so as to be in parallel to the longitudinal direction of the magneto-optical disk drive 30.

Figure 15B:
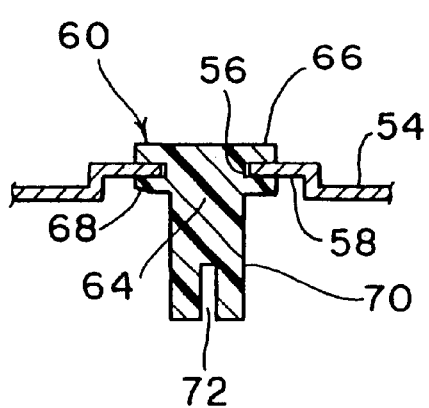
FIG. 15B is a sectional view of a first slider.

At the periphery of the guide groove 56, as shown in FIG. 15B, the cartridge holder 54 is recessed upwardly by drawing or the like, to form a recess 58 on the side on which the magneto-optical disk cartridge 34 is inserted. A first slider 60 and a second slider 62 are slidably fitted in the guide groove 56. As shown in FIG. 15B, the slider 60 has a guide groove insertion portion 64 to be inserted in the guide groove 56, two flanges 66 and 68 with the guide groove insertion portion 64 held therebetween, and a shaft portion 70. A tip portion of the shaft portion 70 has a slit 72.

Figure 16:
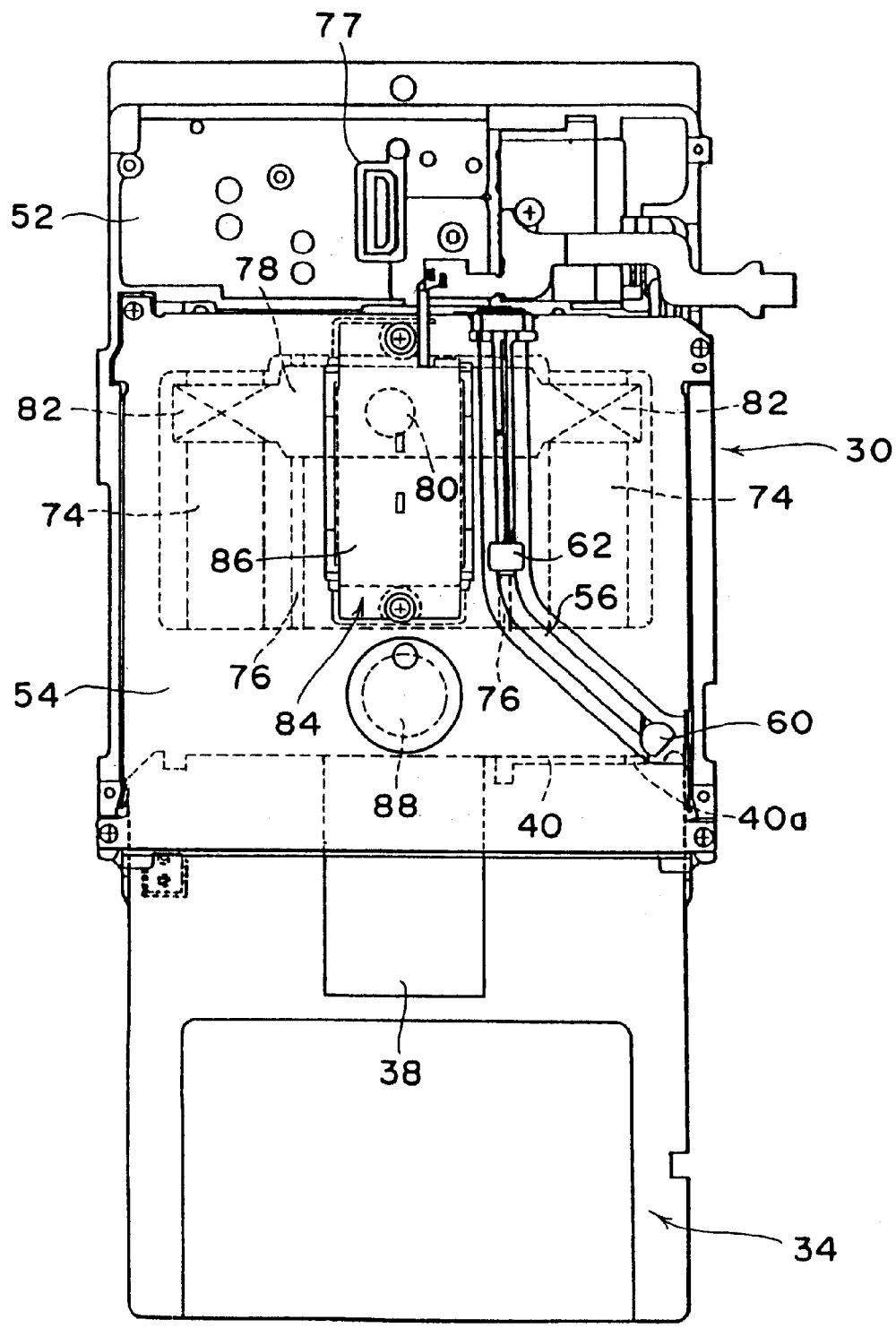
FIG. 16 is a plan view showing a starting state of the insertion of the magneto-optical disk cartridge in the magneto-optical disk drive.

FIG. 16 is a plan view showing a state immediately after the magneto-optical disk cartridge 34 is inserted in the magneto-optical disk drive 30 from the cartridge insertion port 32. When the magneto-optical disk cartridge 34 is inserted in the magneto-optical disk drive 30 from the cartridge insertion port 32, the first slider 60 comes in contact with the end portion 40a of the shutter opening arm 40 mounted on the shutter 38 of the magneto-optical disk cartridge 34. As the magneto-optical disk cartridge 34 is pushed to be further inserted in the magneto-optical disk drive 30 from the state shown in FIG. 16, the first slider 60 is moved inwardly along with the insertion of the magneto-optical disk cartridge 34 and the shutter opening arm 40 is pushed by the moving first slider 60, whereby the shutter 38 is started to be opened. The second slider 62 is coupled with the first slider 60 by means of a spring to be described later, and is moved to the depth side of the disk drive 30 along with the movement of the first slider 60.

A pair of magnetic circuits 74, a pair of guide rails 76, a fixed optical system 77 having a semiconductor laser, a spindle motor 88, etc. are mounted on the drive base 52. Reference numeral 78 designates a carriage which supports an optical head 80 having an objective lens, and which has a pair of coils 82 at positions corresponding to those of the magnetic circuits 74. The magnetic circuit 74 and the coil 82 constitute a voice coil motor (VCM), and when a current is applied to the coils 82, the carriage 78 is moved in the radial direction of the magneto-optical disk 44 while being guided by the pair of guides 76.

Figure 17:
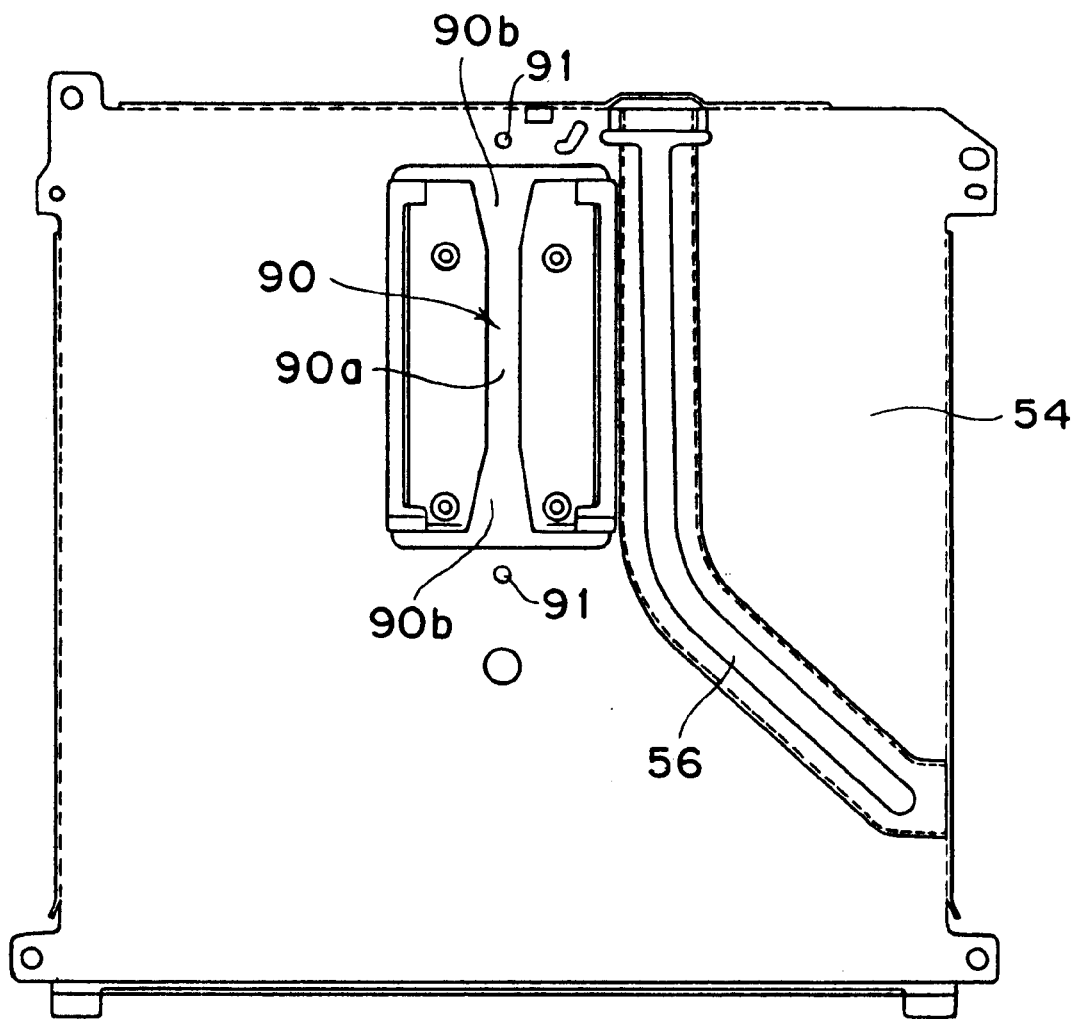
FIG. 17 is a plan view of a cartridge holder.
Figure 18:
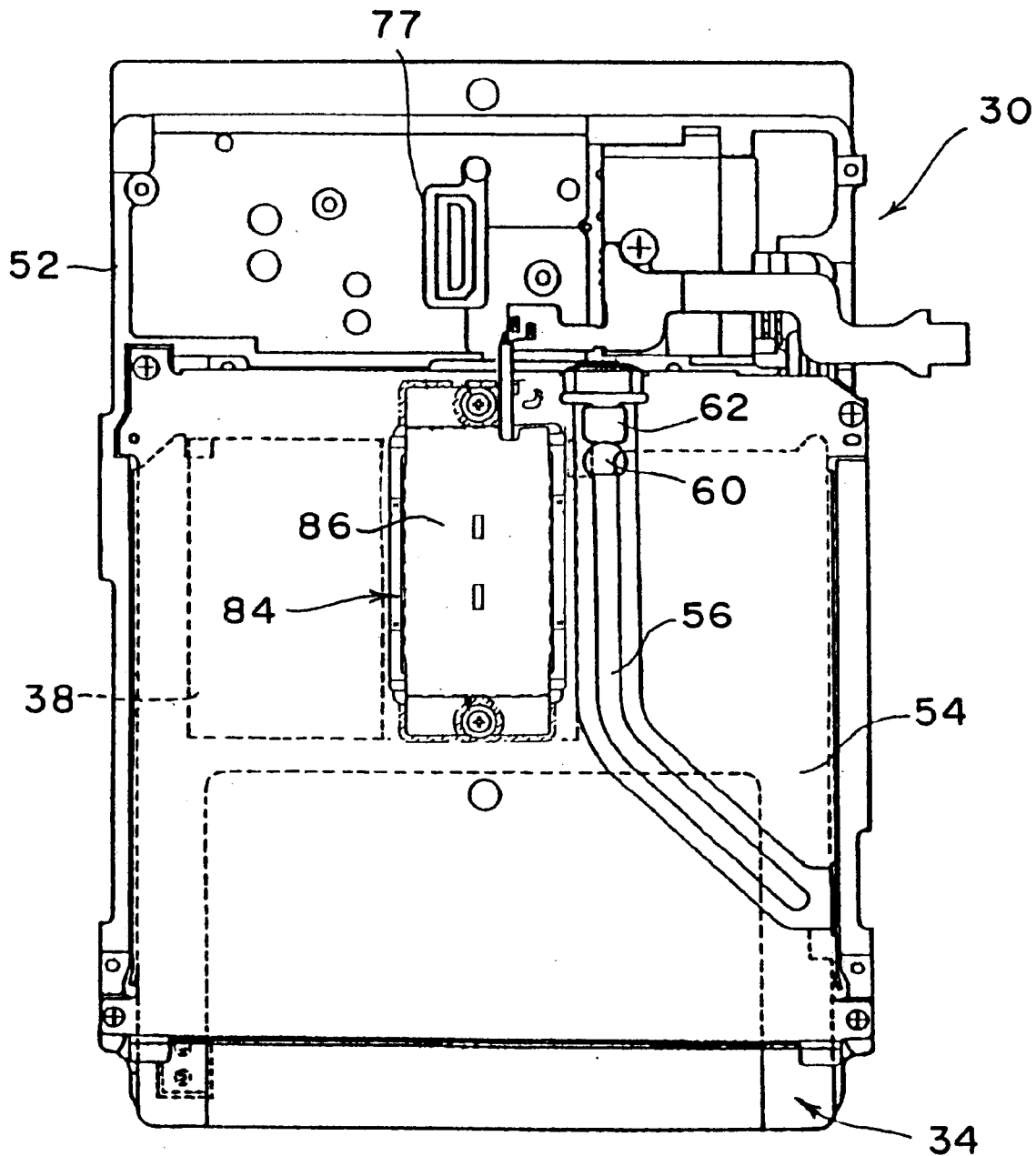
FIG. 18 is a plan view showing the ending state of the insertion of the magneto-optical disk cartridge.

FIG. 17 is a plan view of the cartridge holder 54. The cartridge holder 54 is formed of a steel plate, and has an opening 90 in addition to the guide groove 56. The opening 90 has a straight-line shaped central portion 90a with its width (gap) kept constant, and both end portions 90b with their widths becoming larger as going outwardly. A back yoke 86 on which a coil is disposed is mounted on the cartridge holder 54 at two holes 91 shown in FIG. 17. FIG. 18 shows a state in which the magneto-optical disk cartridge 34 is perfectly inserted in the magneto-optical disk drive 30 from the state shown in FIG. 16 and the shutter 38 is full-opened. When the magneto-optical disk cartridge 34 is inserted in the magneto-optical disk drive 30 as shown in FIG. 18, the shutter 38 of the magneto-optical disk cartridge 34 is automatically full-opened by the first slider 60.

Figure 19:
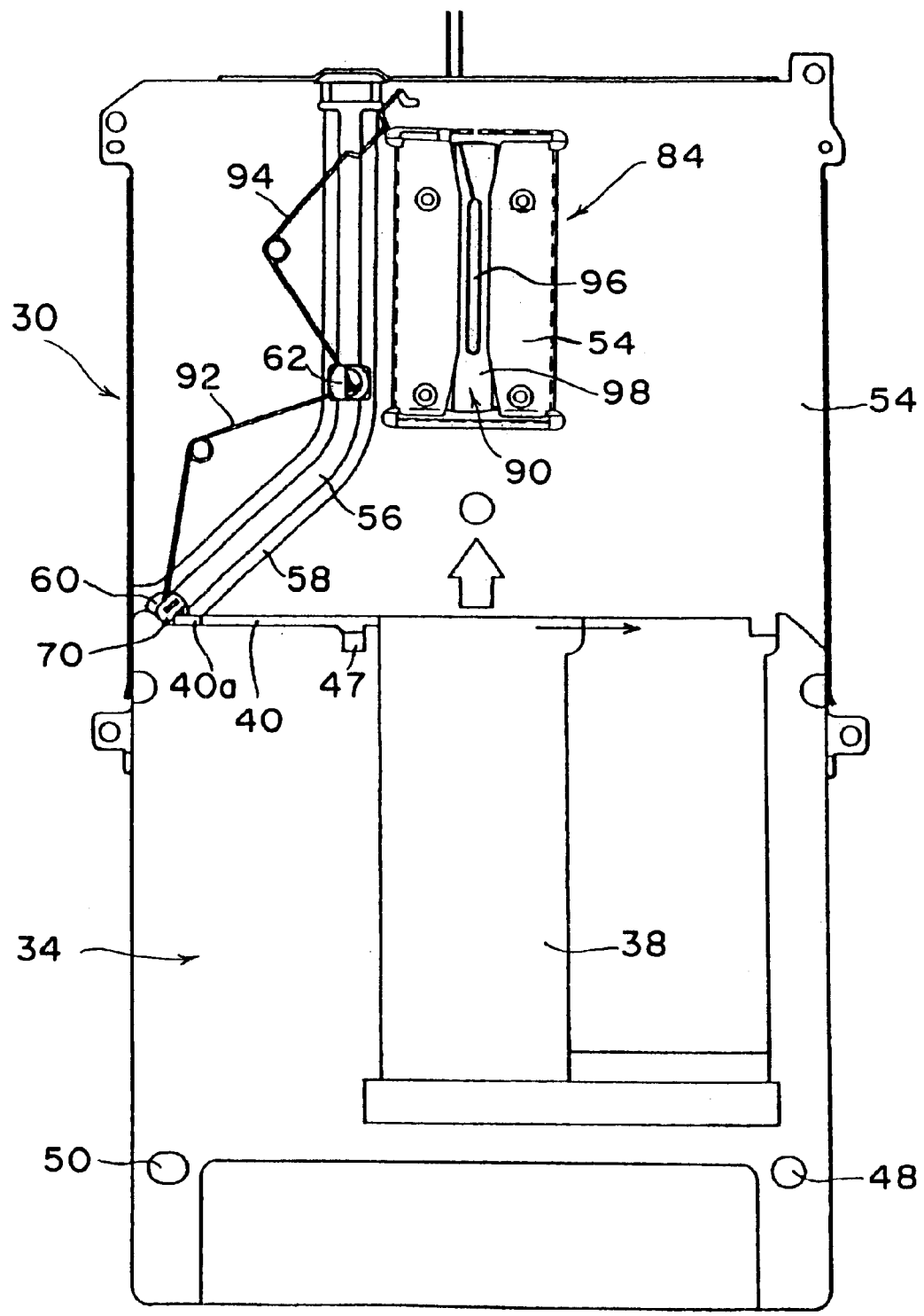
FIG. 19 is a view, seen from a back side, of an essential portion shown in FIG. 16.

FIG. 19 is a view, seen from a back surface side, of a shutter opening/closing mechanism operated as described above. The shutter opening/closing mechanism includes the guide groove 56 provided in the cartridge holder 54, the recess 58 provided around the guide groove 56, the first and second sliders 60 and 62 slid in the guide groove 56 and in the recess 58, a first torsion spring 92 mounted between the first and second sliders 60 and 62, and a second torsion spring 94 mounted between the second slider 62 and an end portion of the cartridge holder 54.

Figure 20:
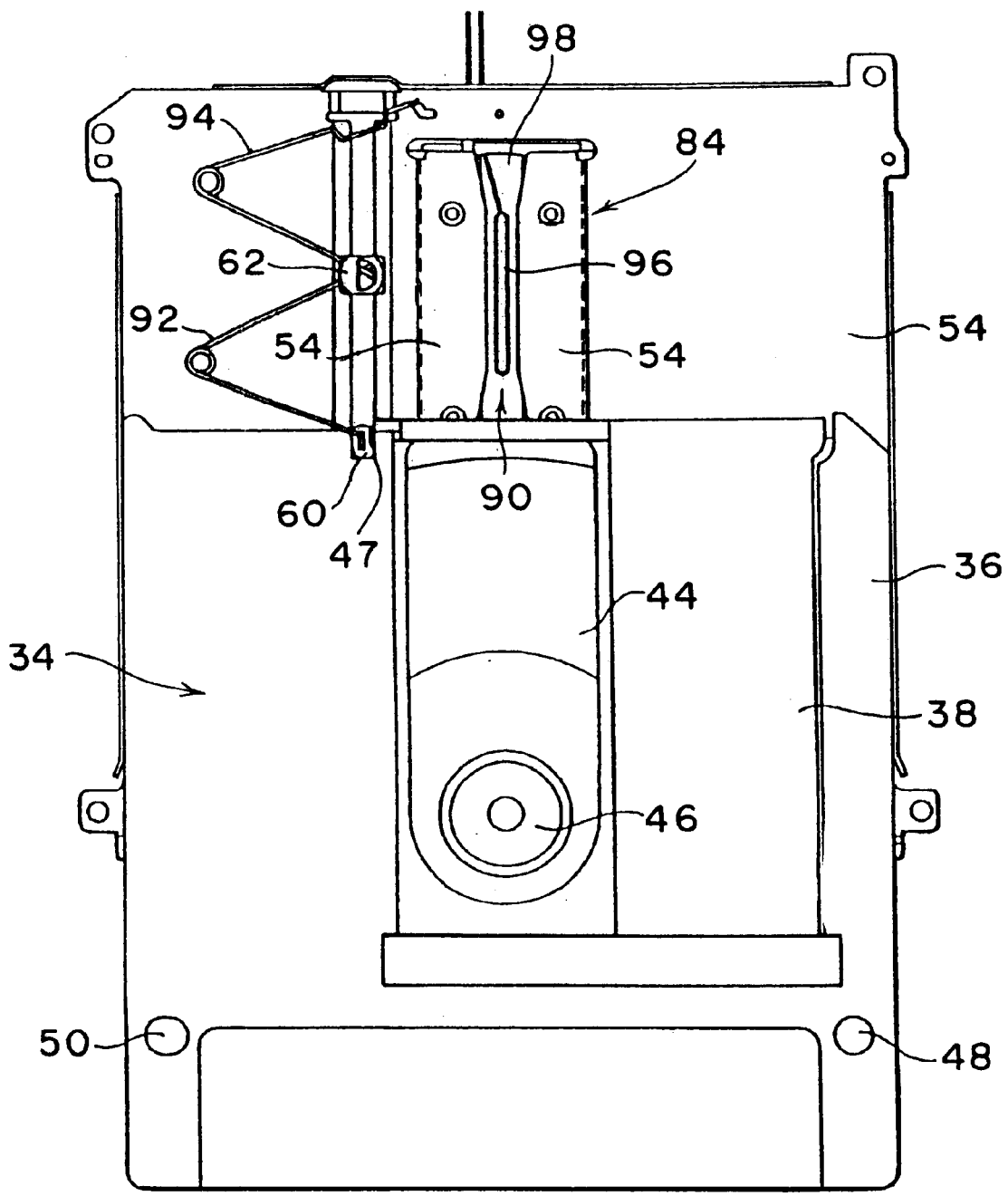
FIG. 20 is a view of the magneto-optical disk cartridge in a state in which the shutter is opened.

FIG. 20 is a view showing a state in which the magneto-optical disk cartridge 34 is further inserted in the magneto-optical disk drive 30 from the state shown in FIG. 19 and the shutter 38 is full-opened. When the shutter 38 is full-opened, the first slider 60 is fitted in a cutout 47 formed in the magneto-optical disk cartridge 34 and is kept as it is with the shutter 38 opened.

As is apparent from FIG. 20, the shutter 38 of the magneto-optical disk cartridge 34 becomes full-opened in the course of insertion of the magneto-optical disk cartridge 34 in the magneto-optical disk drive 30, and the magneto-optical disk cartridge 34 is further inserted on the depth side of the magneto-optical disk drive 30 from this state. The reason why the shutter 38 of the magneto-optical disk cartridge 34 becomes full-opened in the course of insertion of the magneto-optical disk cartridge 34 is that the spindle motor 88 chucks the hub 46 of the magneto-optical disk 44 after the shutter 38 is full-opened.

A magnetic field generator 84 is mounted on the cartridge holder 54. The magnetic field generator 84 includes a portion of the cartridge holder 54, which has the opening 90 and acts as a top yoke; the back yoke 86 fixed on the cartridge holder 54 after position adjustment; a center yoke 96 fixed on the back yoke 86; and a coil 98 disposed around the center yoke 96. As shown in FIG. 16, the magnetic field generator 84 is mounted to the cartridge holder 54 in such a manner as to cover the movement range of the optical head 80. The optical head 80 and the magnetic field generator 84 are opposed to each other with the magneto-optical disk 44 put therebetween.

Figure 21:
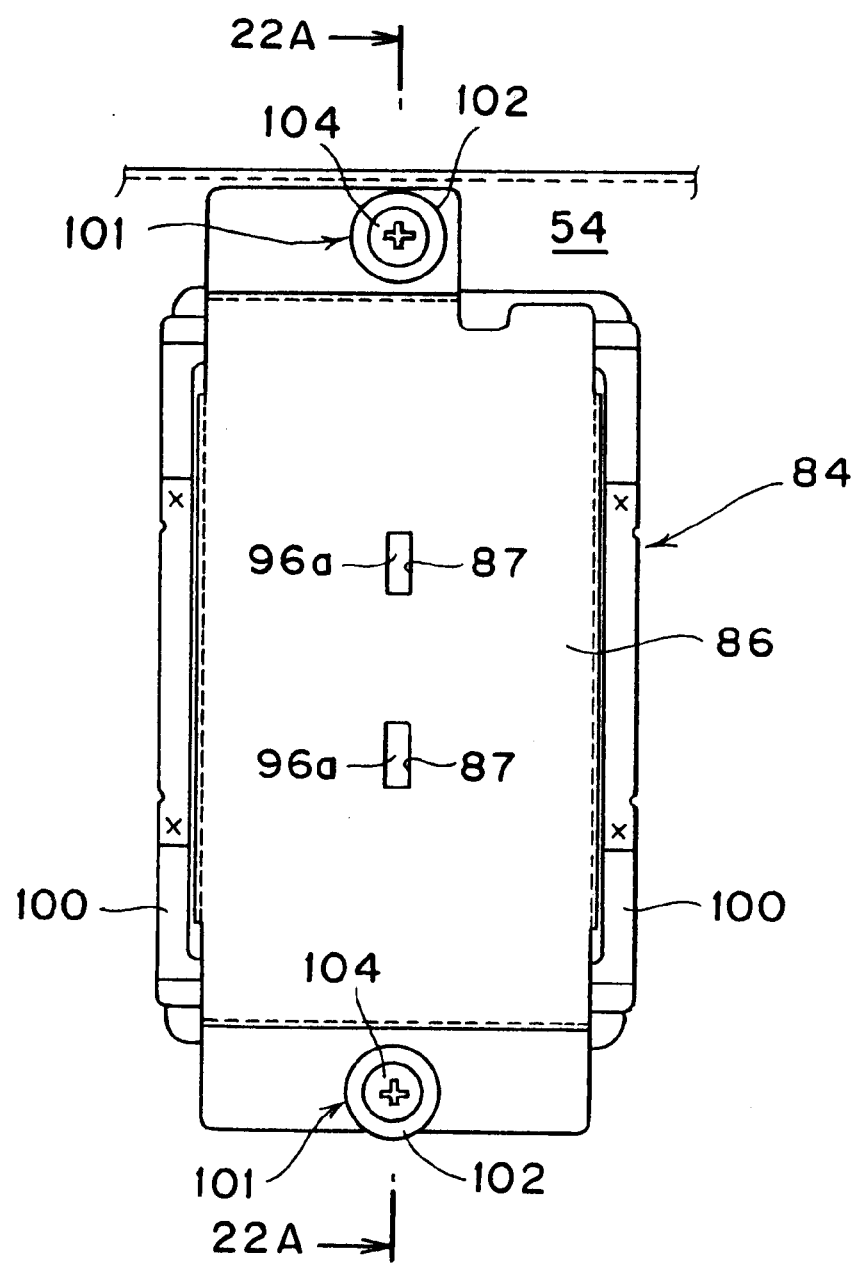
FIG. 21 is a plan view of a magnetic field generator according an embodiment of the present invention.
Figure 22A:
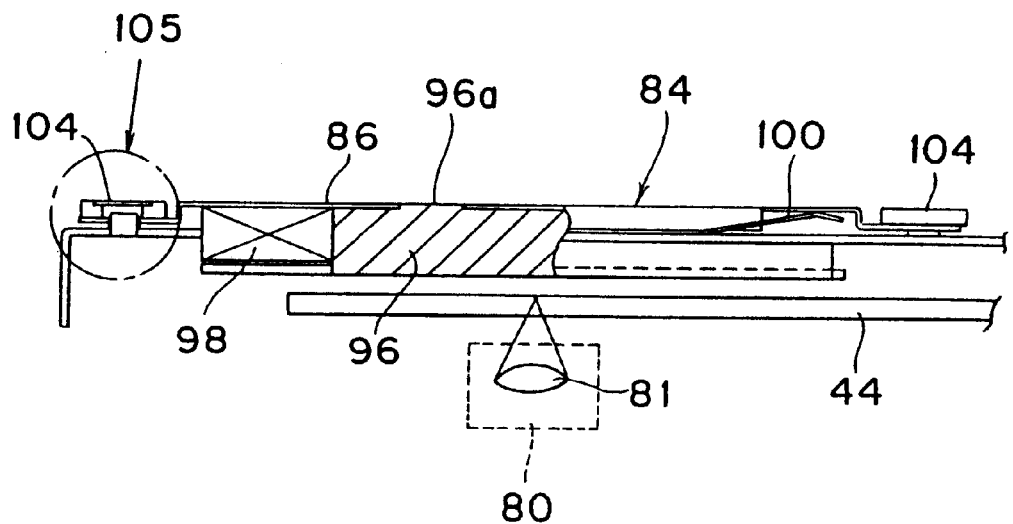
FIG. 22A is a sectional view taken on line 22A—22A of FIG. 21.

FIG. 21 is a plan view of the magnetic field generator 84, and FIG. 22A is a sectional view taken on line 22A—22A of FIG. 21. The back yoke 86 has two openings 87, and projections 96a of the center yoke 96 are inserted in the openings 87 and fixed thereto by caulking. The center yoke 96 is made from permalloy. The back yoke 86 is formed of a steel plate. Insulating sheets are disposed on portions, in proximity to the coil 98, of respective yokes.

Figure 22B:
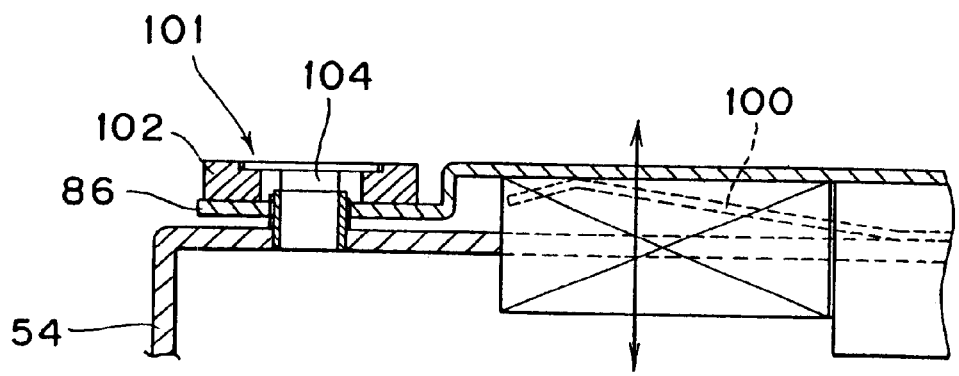
FIG. 22B is an enlarged view of a portion surrounded by a circle 105 in FIG. 22A.

A pair of plate springs 100 are inserted between the cartridge holder 54 and the back yoke 86 for biasing the back yoke 86 in the direction in which the back yoke 86 becomes apart from the cartridge holder 54. Further, a pair of adjustably fixing means 101 are provided for allowing the adjustment of the vertical position of the back yoke 86 with respect to the plate plane of the cartridge holder 54 against a biasing force of the plate spring 100. FIG. 22B is an enlarged view of a portion surrounded by a circle 105 in FIG. 22A. As is best shown in FIG. 22B, each of the adjustably fixing means 101 includes a spacer 102 and a screw 104. To forcibly fix the back yoke 86 to the cartridge holder 54, an adhesive is finally applied to the screws 104 and the corresponding screw holes.

Figure 23:
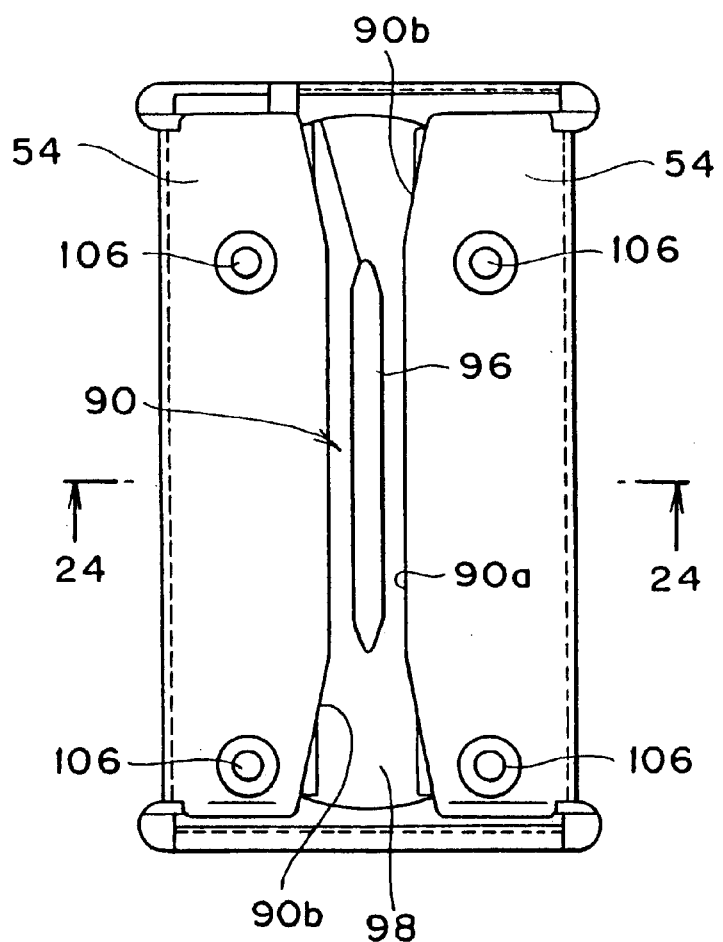
FIG. 23 is a rear view of the magnetic field generator according to the embodiment.
Figure 24:
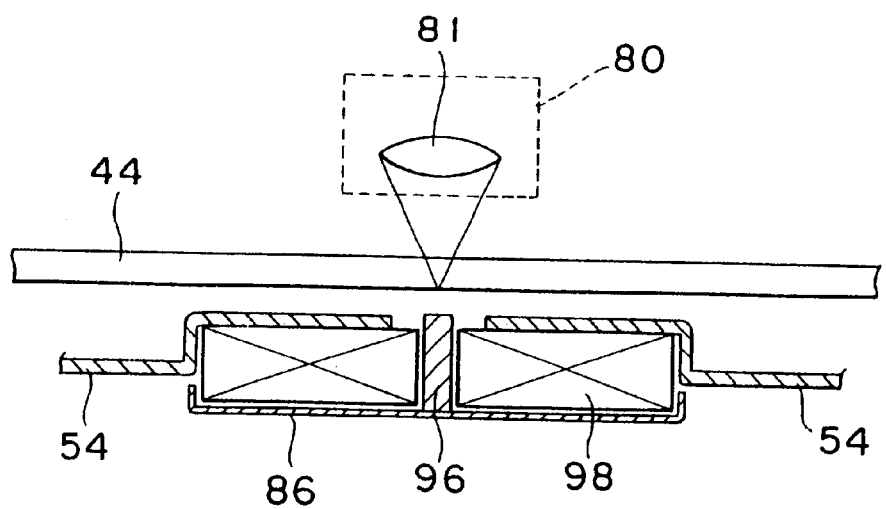
FIG. 24 is a sectional view taken on line 24—24 of FIG. 23.

As shown in FIGS. 22A and 24, a laser beam is focused on the magneto-optical disk 44 through an objective lens 81 of the optical head 80. The objective lens 81 faces to the center yoke 96 of the magnetic field generator 84. As shown in FIG. 23, the coil 98 is disposed around the center yoke 96. The opening 90 has the straight-line shaped portion 90a with its gap kept constant and the both end portions 90b with their gaps becoming larger as going outwardly from both ends of the center yoke 96.

The both end portions of the center yoke 96 are tapered. The taper shapes of the both end portions of the center yoke 96 are effective to reduce magnetic field strengths at the both end portions, and hence to equalize the magnetic field strengths over the entire length of the center yoke 96. As described with reference to FIG. 9, a gap of the straight-line shaped portion 90a is kept constant at about 3.8 mm, and a length thereof is about 20.5 mm. A tilt angle θ of each of the both end portions 90b of the opening 90 is set to about 10°.

Four flat projections 106 are formed on the cartridge holder 54, to prevent the magneto-optical disk cartridge 34 having been inserted in the disk drive from colliding with the cartridge holder 54 and/or the center yoke 96. According to the magnetic field generator 84 in this embodiment, since the pair of plate springs 100 are interposed between the cartridge holder 54 and the back yoke 86, and the back yoke 86 is fixed to the cartridge holder 54 by means of the pair of adjustably fixing means 101, a gap between the magneto-optical disk 44 and the center yoke 96 can be adjusted at an optimum value, to thereby fix the back yoke 86 to the cartridge holder 54 after an assembly error is corrected.

Figure 25:
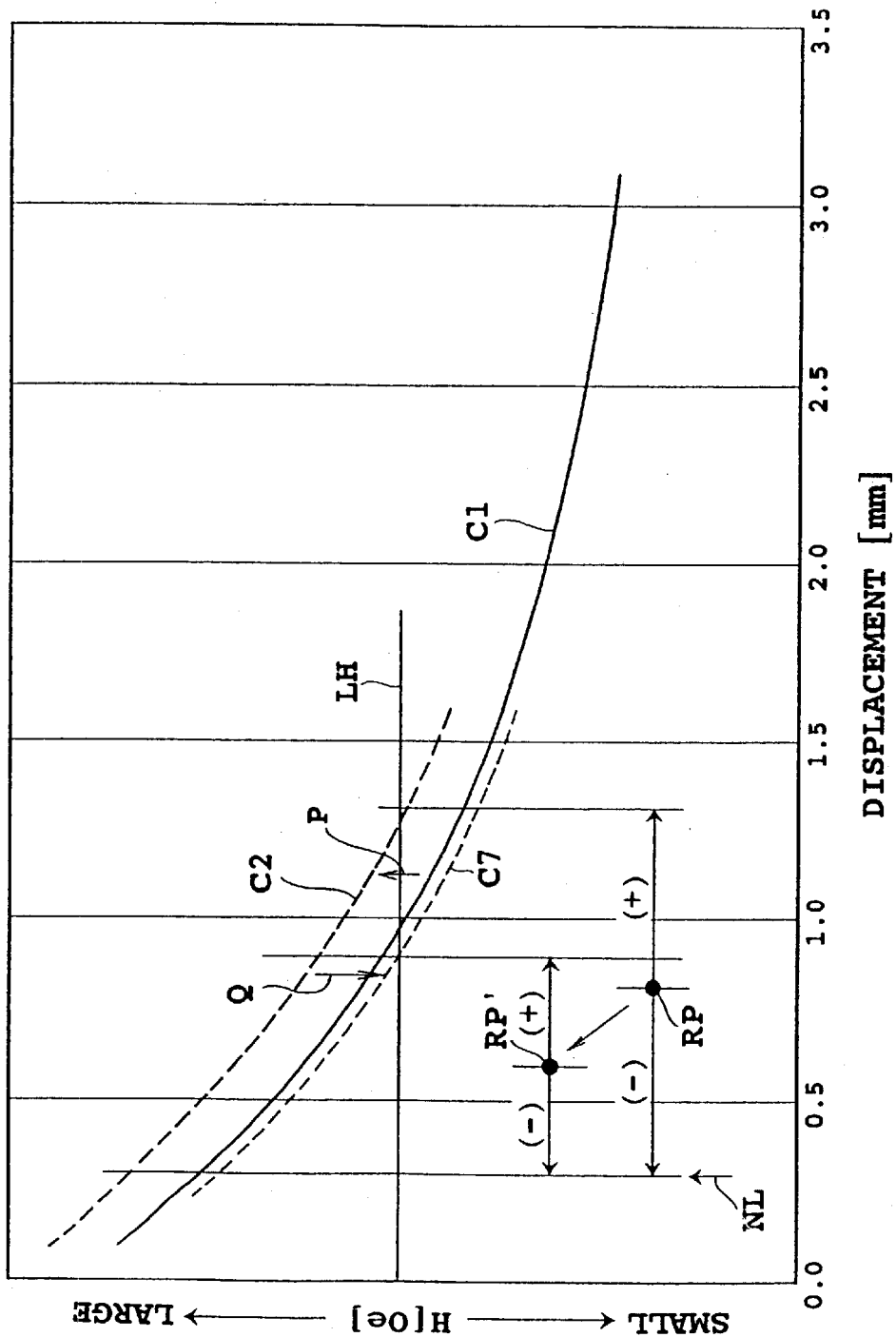
FIG. 25 is a graph showing a magnetic field distribution in the height direction of the magnetic field generator according to the embodiment of the present invention in comparison with that of the prior art magnetic field generator.

FIG. 25 is a graph, similar to that of FIG. 4, showing a magnetic field distribution in the height direction of the magnetic field generator according to this embodiment of the present invention in comparison with that of the prior art magnetic field generator. As described with reference to FIG. 4, character LH designates a necessary minimum magnetic field strength, and character NL designates a nearest limit position. Character C1 is a magnetic field strength curve against an arbitrary current value. The prior art magneto-optical generator has an assembly error of ±0.5 mm from a reference position (design position) RP. Such an assembly error cannot be corrected, and accordingly, to obtain the necessary minimum magnetic field strength LH by correcting the assembly error, it is required to obtain a magnetic field strength curve C2 shown by a dashed line by increasing a current applied to the coil as shown by an arrow P.

According to this embodiment, since the back yoke 86 is adjustably fixed to the cartridge holder 54 by using the pair of plate springs 100 and the pair of adjustably fixing means 101, the gap between the magneto-optical disk 44 and the center yoke 96 can be adjusted to an optimum value after assembly. Accordingly, the reference position can be moved from RP to RP', that is, moved toward the magneto-optical disk 44, whereby an assembly variation can be reduced. As a result, even if the current applied to the coil is reduced as shown by an arrow Q, a necessary minimum magnetic field strength shown by a curve C7 can be obtained, thereby allowing the energy-saving and reduction in heat generation of the magnetic field generator 84.

According to the present invention, it is possible to provide a magnetic field generator capable of improving the magnetic field generation efficiency and the magnetic field strength over the entire recording region, and also realizing stable characteristics, and hence to provide a magneto-optical storage device capable of achieving stable reproducing/recording/erasing characteristics over the entire recording region by using the magnetic field generator. Further, since a desired magnetic field can be obtained without increasing a current, it is possible to reduce heat generation and prevent variations in reproducing/recording/erasing characteristics caused by environmental temperatures, and hence to allow further high density recording.

The present invention is not limited to the details of the above-described preferred embodiments. The scope of the invention is defined by the appended claims and all changes and modifications as fall within the equivalence of the scope of the claims are therefore to be embraced by the invention.

What is claimed is:

1. A magnetic field generator comprising:
   a coil;
   a center yoke disposed in a central portion of said coil;
   a top yoke having an opening from which an upper portion of said center yoke is exposed, said top yoke being disposed on an upper surface side of said coil; and
   a back yoke disposed on a back surface side of said coil;
   wherein said opening has a straight-line shaped central portion with its gap kept constant, and enlarged portions with their gaps becoming larger as going outwardly from the vicinities of both end portions of said center yoke.

2. A magneto-optical storage device for storing information on a magneto-optical storage medium, comprising:
   a holder for accommodating said magneto-optical storage medium having been inserted in said magneto-optical storage device;
   an optical head for irradiating said magneto-optical storage medium with a light beam; and
   a magnetic field generator disposed on said holder;
   said magnetic field generator comprising:
      a coil;
      a center yoke disposed in a central portion of said coil;
      a top yoke having an opening from which an upper portion of said center yoke is exposed, said top yoke being disposed on an upper surface side of said coil; and
      a back yoke disposed on a back surface side of said coil;
      wherein said opening has a straight-line shaped central portion with its gap kept constant, and enlarged portions with their gaps becoming larger as going outwardly from the vicinities of both end portions of said center yoke.

3. A magneto-optical storage device according to claim 2, wherein the gap of said straight-line shaped central portion of said opening is smaller than 6.2 mm and larger than a width of said center yoke.

4. A magneto-optical storage device according to claim 2, wherein said center yoke is made from a high permeability material.

5. A magneto-optical storage device according to claim 2, wherein an overall length of said center yoke is shorter than an overall length of said top yoke.

6. A magneto-optical storage device according to claim 2, wherein both ends of said center yoke are tapered.

7. A magneto-optical storage device according to claim 2, wherein said center yoke has a central portion having a rectangular cross-section with its height kept constant, and both end portions with their heights becoming gradually lower as going outwardly.

8. A magneto-optical storage device according to claim 2, wherein said magnetic field generator further comprises adjustably fixing means for adjustably fixing said back yoke to said top yoke.

9. A magneto-optical storage device according to claim 8, wherein said adjustably fixing means comprises a spring for biasing said back yoke in the direction in which said back yoke becomes apart from said top yoke, and fixing means for fixing said back yoke against a biasing force of said spring.

10. A magneto-optical storage device for storing information on a magneto-optical storage medium, comprising:
    a holder for accommodating said magneto-optical storage medium having been inserted in said magneto-optical storage device;
    an optical head for irradiating said magneto-optical storage medium with a light beam; and
    a magnetic field generator disposed on said holder;
    said magnetic field generator comprising:
       a coil;
       a center yoke disposed in a central portion of said coil;
       a top yoke having an opening from which an upper portion of said center yoke is exposed, said top yoke being disposed on an upper surface side of said coil;
       a back yoke disposed on a back surface side of said coil; and
       adjustably fixing means for fixing said back yoke to said top yoke after adjustably setting a position of said back yoke to said top yoke.

11. A magneto-optical storage device according to claim 10, wherein said adjustably fixing means comprises a spring for biasing said back yoke in the direction in which said back yoke becomes apart from said top yoke, and fixing means for fixing said back yoke against a biasing force of said spring.

* * * * *